(12) United States Patent
Mochizuki

(10) Patent No.: US 7,113,298 B2
(45) Date of Patent: Sep. 26, 2006

(54) PRINTING SYSTEM, PRINTING METHOD AND APPARATUS

(75) Inventor: Mamoru Mochizuki, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 1031 days.

(21) Appl. No.: 09/733,030

(22) Filed: Dec. 11, 2000

(65) Prior Publication Data
US 2002/0001495 A1   Jan. 3, 2002

(30) Foreign Application Priority Data
Jul. 3, 2000   (JP) ............................. 2000-200522

(51) Int. Cl.
*G06F 3/12*   (2006.01)
*G06K 15/00*   (2006.01)
(52) U.S. Cl. .................................. 358/1.15; 358/1.14
(58) Field of Classification Search ......... 358/1.1–1.18
See application file for complete search history.

(56) References Cited

U.S. PATENT DOCUMENTS
6,020,973 A * 2/2000 Levine et al. ............... 358/1.15
6,697,073 B1* 2/2004 Kadota ....................... 345/501

FOREIGN PATENT DOCUMENTS
JP    7-104949    4/1995
JP    11-39115    2/1999
JP    11-345102   12/1999

* cited by examiner

*Primary Examiner*—Douglas Q. Tran
(74) *Attorney, Agent, or Firm*—Armstrong, Kratz, Quintos, Hanson & Brooks, LLP

(57) ABSTRACT

In a printing system connecting a print requester host and a single or a plurality of print requestee printer by way of a network, the host abstractly defines an output port to an actual printer as the print requestee printer, for printing. The host makes a print request to the abstractly defined output port so that between the host and the printer on the network there are made in sequence for printing a retrieval request from the host, a retrieval response from the printer, a print request from the host, and a response to the print request from the printer.

16 Claims, 22 Drawing Sheets

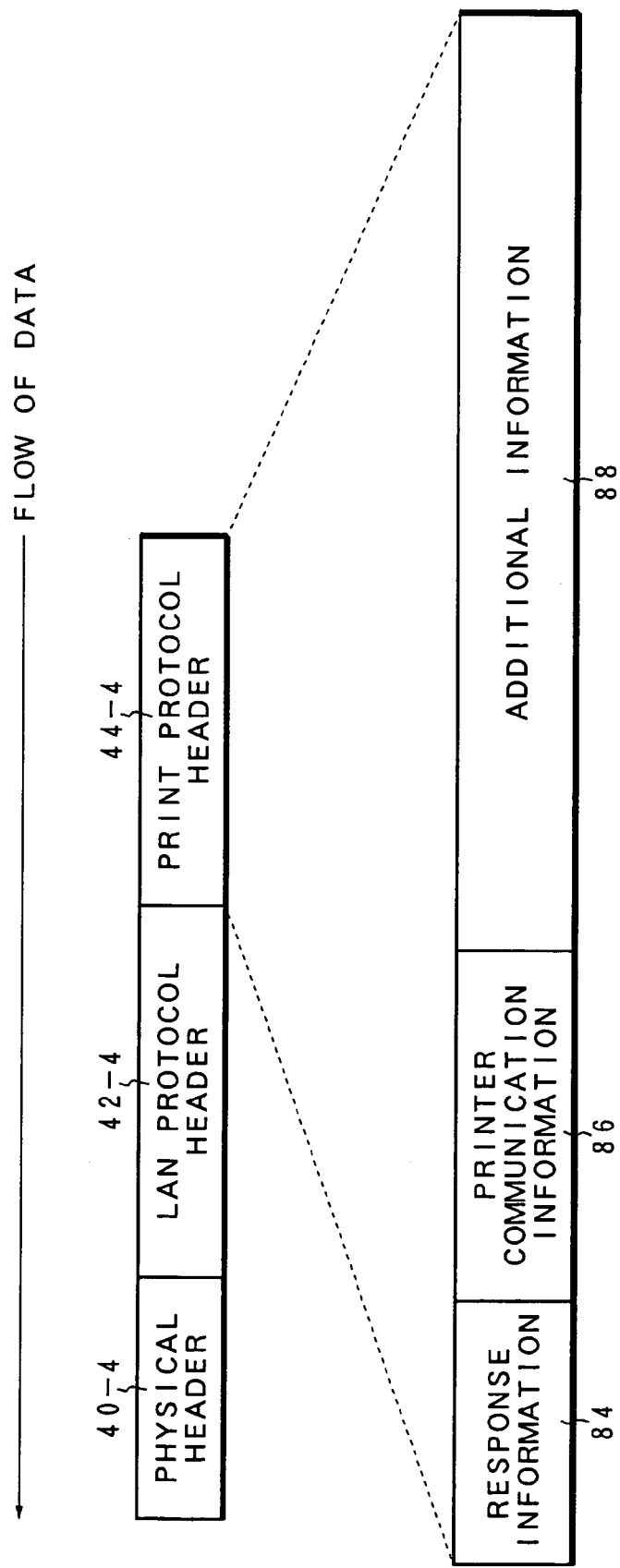

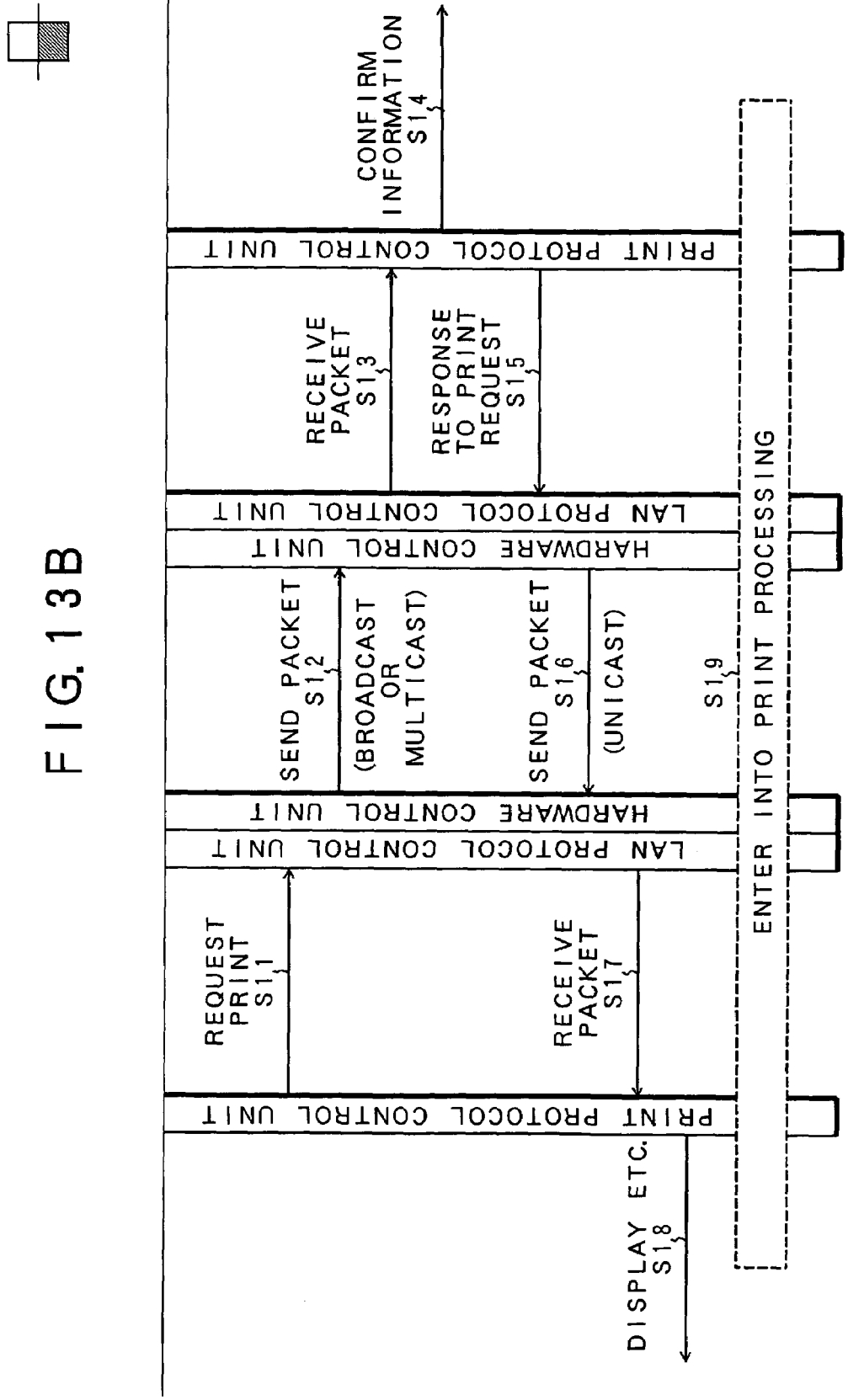

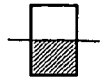
FIG. 15B
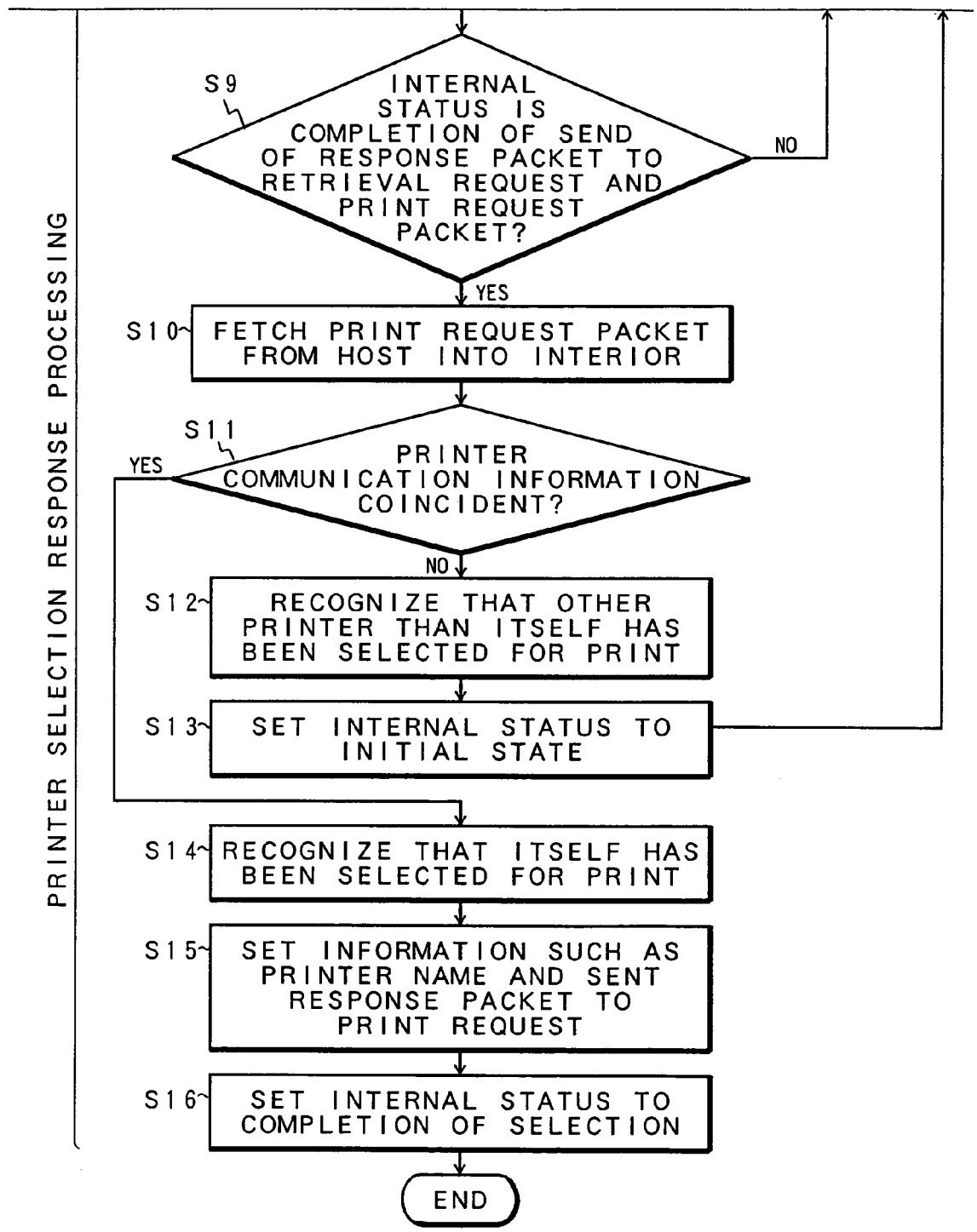

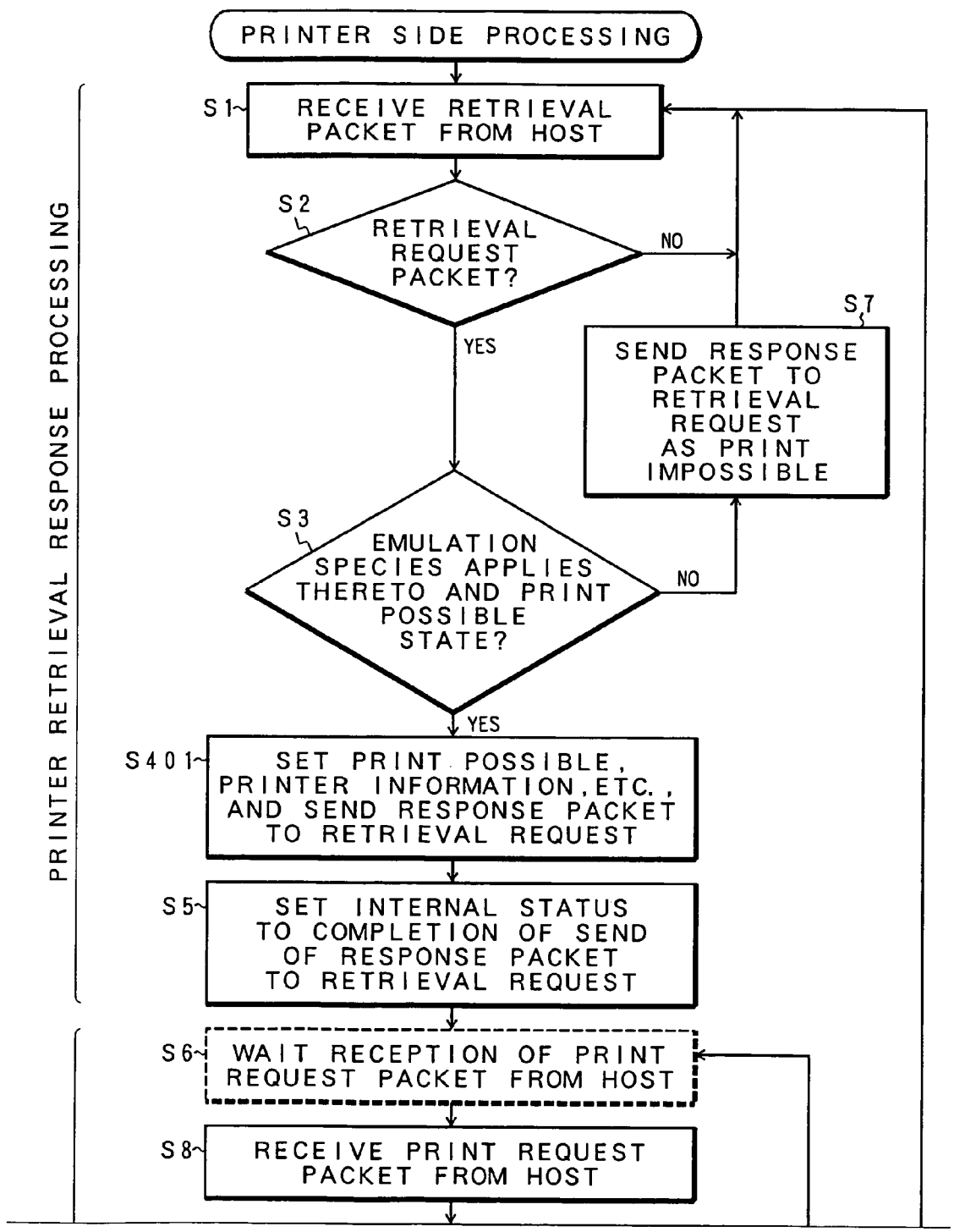

PRINTING SYSTEM, PRINTING METHOD AND APPARATUS

BACKGROUND OF THE INVENTION

1. Field of the Invention

The present invention relates generally to a printing system, printing method and apparatus using for print a plurality of printers connected via a network to a print requester host, and more particularly, to a printing system, printing method and apparatus automatically selecting a print enabled printer for print without the requester host being conscious of the actual printer.

2. Description of the Related Arts

Up until now, in a network adaptable printing system including printers directly connected to, e.g., Ethernet LAN, there was a need for the host side to define a printer to be output. For this reason, the definition of a printer has hitherto been made on the host definitely designating a path (port) to the printer to be output. lpd is prevailing as a typical print protocol for such a network adaptable printer. lpd was originally employed as a UNIX system print protocol although it is recently being supported by other operating systems such as Windows NT than the UNIX system. In case of printing by use of lpd, BSD system UNIX needs a definite designation, on "/etc/printcap file", of the host name (IP address) and print queue name (printer name) of the target printer. SVR4 system UNIX and WindowsNT have also similar setting items, so that it would be difficult to perform the lpd protocol printing by way of a network without setting those items. This means that in case of performing a printing via the network the host needs to recognize the target printer. For example, in the event of lpd protocol printing in TCP/IP, the printer side information to be recognized by the host can be the printer IP address, etc.

However, in the network adaptable printing system needing the definite setting of the target printer by the host side, in case of addition of a new printer to the network, alteration of information such as printer address, etc., and exclusion of the printer from the network, the host side printer definition is also subjected to addition, alteration and deletion, resulting in an inefficiency from the viewpoint of the network management. Furthermore, in case of attempting to select an idle printer for printing to obviate the printing by a job rich printer in an environment where a plurality of printers lie on the network, the operating status of the printer had to actually be referred to by use of a separately existing network managing soft, i.e., different processing from the print processing had to be made once or more previous to the printing operation.

SUMMARY OF THE INVENTION

The present invention provides a printing system, a printing method and apparatus, ensuring an effective management and operation without any need for redefinition on the print requester host regardless of possible addition, change or deletion of the printers on the network.

According to a first aspect of the present invention there is provided a printing system comprising a print requester host; and a single or a plurality of print requestee printers connected via a network to the host; the host abstractly defining an output port to an actual printer as the print requestee printer to perform a printing operation. Upon abstract definition of the output port to the actual printer as the print requestee printer, the host automatically selects a specific printer for printing through sequential execution, between the host and the printer on the network, of a retrieval request from the host, a retrieval response from the printer, a print request from the host, and a response to the print request from the printer. In this manner, when defining a printer on the host, a port of the printer is abstractly defined and both the host and the printer provide a print protocol control for printer retrieval, etc., whereby a single printer has only to be defined on the host without need for redefinition of the printer even in the case of addition of a new printer to the network, the case of alteration of address, etc., of the existing printer, and the case of removal of the printer from the network, thus achieving an effective and easy management or operation of the network and the printer. Furthermore, the host side need not be conscious of the printer to make effective use of the idle printer.

The print control protocol for the printer retrieval comprises the following procedure. That is, upon occurrence of a print request on the host, the host sends a retrieval request packet to all printers on the network; the printer that has received the retrieval request packet from the host, if enabled for print, sends a retrieval response packet to the host; upon receipt of the retrieval response packet from the printer, the host selects as a requestee candidate a printer from which the host has first received a retrieval response, to send a print request packet to the requestee candidate printer; the requestee candidate printer that has received the print request packet sends a validation response packet to a print request to the host; and upon receipt of the validation response packet from the requestee candidate printer, the host determines the requestee candidate printer as a print requestee to execute print processing.

The printer that has received a retrieval request packet from the host sends a retrieval response packet to the host, the retrieval response packet containing communication information on the printer itself; upon receipt of the retrieval response packet from the printer, the host sends a print request packet to all printers on the network, the print request packet containing communication information on a printer selected; and upon receipt of the print request packet, the printer compares printer communication information contained in the print request packet with its own printer communication information, the printer if coincident recognizing that the printer itself has been selected, to send a validation response packet to the host. The host displays information indicative of a printer selected on the basis of a printer response packet, on a user interface.

The present invention also allows the host to designate a specific printer for performing a printing operation. In this case, the host makes a retrieval request to the printers on the network, the retrieval request containing printer specific information for specifying a printer such as unique printer name or placement site, the host automatically selecting a specific printer that conforms with previously entered printer specific information, for printing. The protocol to this end comprises the following procedure. That is, the host sends a retrieval request packet to all printers on the network with unique printer specific information designated; upon receipt of the retrieval request packet from the host, the printer sends a retrieval response packet to the host providing that the printer is enabled for print and that the designated unique printer specific information is coincident with its own printer specific information; upon receipt of the retrieval response packet from the printer, the host when the received printer specific information coincides with the designated printer specific information sends a print request packet to the printer having coincident printer specific information; a specific printer that has received the print request packet sends a validation response packet to a print request to the host; and upon receipt of the validation response packet from the printer, the host determines the printer as a print requestee for print processing.

According to a second aspect of the present invention there is provided a printing method for performing a printing operation by selective use of a single or a plurality of printers connected via a network from a print requester host, the method comprising the step of abstractly defining on the host an output port to an actual printer as a print requestee printer, to perform the printing operation. In the printer selection protocol of this printing method, upon abstract definition on the host of the output port to the actual printer as the print requestee printer, a specific printer is automatically selected for printing through sequential execution, between the host and the printer on the network, of a retrieval request from the host, a retrieval response from the printer, a print request from the host, and a response to the print request from the printer. The details of this printing method are the same as those of the printing system.

According to a third aspect of the present invention there is provided a print requester apparatus (host) for performing a printing operation by selective use of any one of a plurality of printers connected via a network, the print requester apparatus comprising an output port that is abstractly defined as an output path to an actual printer when a print request takes place; and a printer retrieval unit which, upon abstract definition of the output port, automatically selects a specific printer for printing through sequential execution, between the printer retrieval unit and the printer on the network, of a retrieval request from the host, a retrieval response from the printer, a print request from the host, and a response to the print request from the printer.

According to a fourth aspect of the present invention there is provided a printer connected via a network to a print requester host, the printer comprising a retrieval response unit for allowing itself to be selected as a print requestee through a sequential execution of a retrieval response to a retrieval request from the host and a response to a print request from the host. The details of the host acting as the print requester apparatus and of the printer acting as the print requestee apparatus are the same as the case of the system configuration.

The above and other objects, features and advantages of the present invention will become more apparent from the following detailed description when read in conjunction with the accompanying drawings.

BRIEF DESCRIPTION OF THE DRAWINGS

FIG. 12 is an explanatory diagram of a response packet from the printer to a print request from the host;

FIGS. 15A and 15B are flowcharts of the print protocol control of the printer side in accordance with the present invention, corresponding to FIGS. 14A and 14B, respectively;

FIGS. 19A and 19B are flowcharts of the printer side print protocol control in accordance with the present invention corresponding to FIGS. 18A and 18B, respectively.

DETAILED DESCRIPTION OF THE PREFERRED EMBODIMENTS

Figure 1:
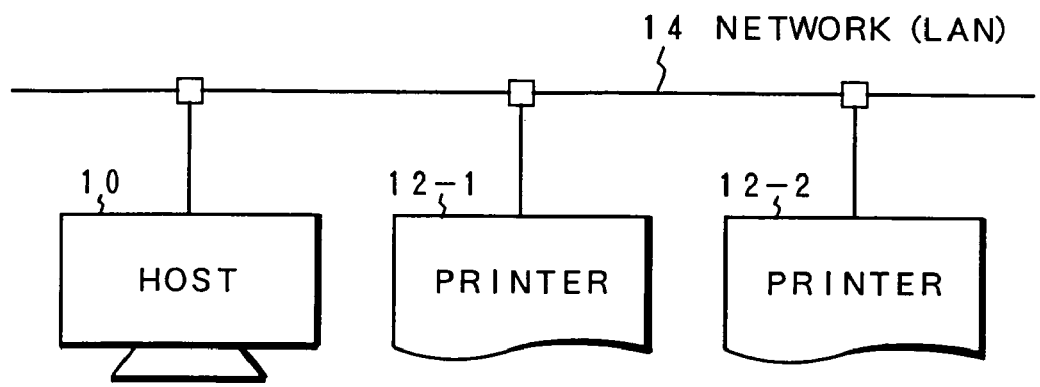
FIG. 1 is an explanatory diagram of a printing system in accordance with the present invention.

FIG. 1 is an explanatory diagram of a printing system in accordance with the present invention. In the printing system of the present invention, a host 10 is connected to a plurality of printers 12-1 and 12-2 by way of a network 14 such as Ethernet LAN. The host 10 and the printers 12-1, 12-2 provided in such a printing system of the present invention are configured as follows.

Figure 2:
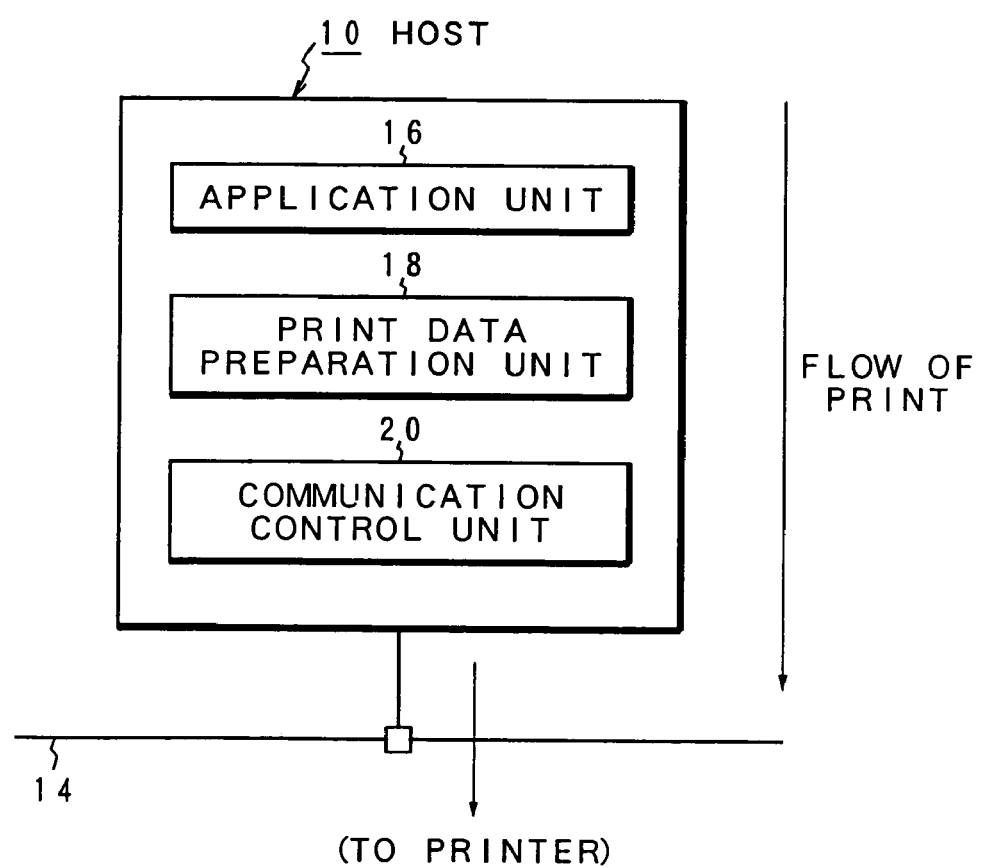
FIG. 2 is an explanatory diagram of the configuration of a host of FIG. 1.

The host 10 comprises as shown in FIG. 2 an application 16, a print data preparation unit 18 and a communication control unit 20. The application 16 is a part corresponding to a software such as a word processor or a spreadsheet. The print data preparation unit 18 is a part corresponding to a printer driver for converting data on the application 16 into a printer interpretable form, i.e., a command system.

The communication control unit 20 provides a protocol control for interchanging print data between the host 10 and the printers. Flow of ordinary print in this host is directed from the application 16 through the print data preparation unit 18 and the communication control unit 20 toward the printer.

Figure 3:
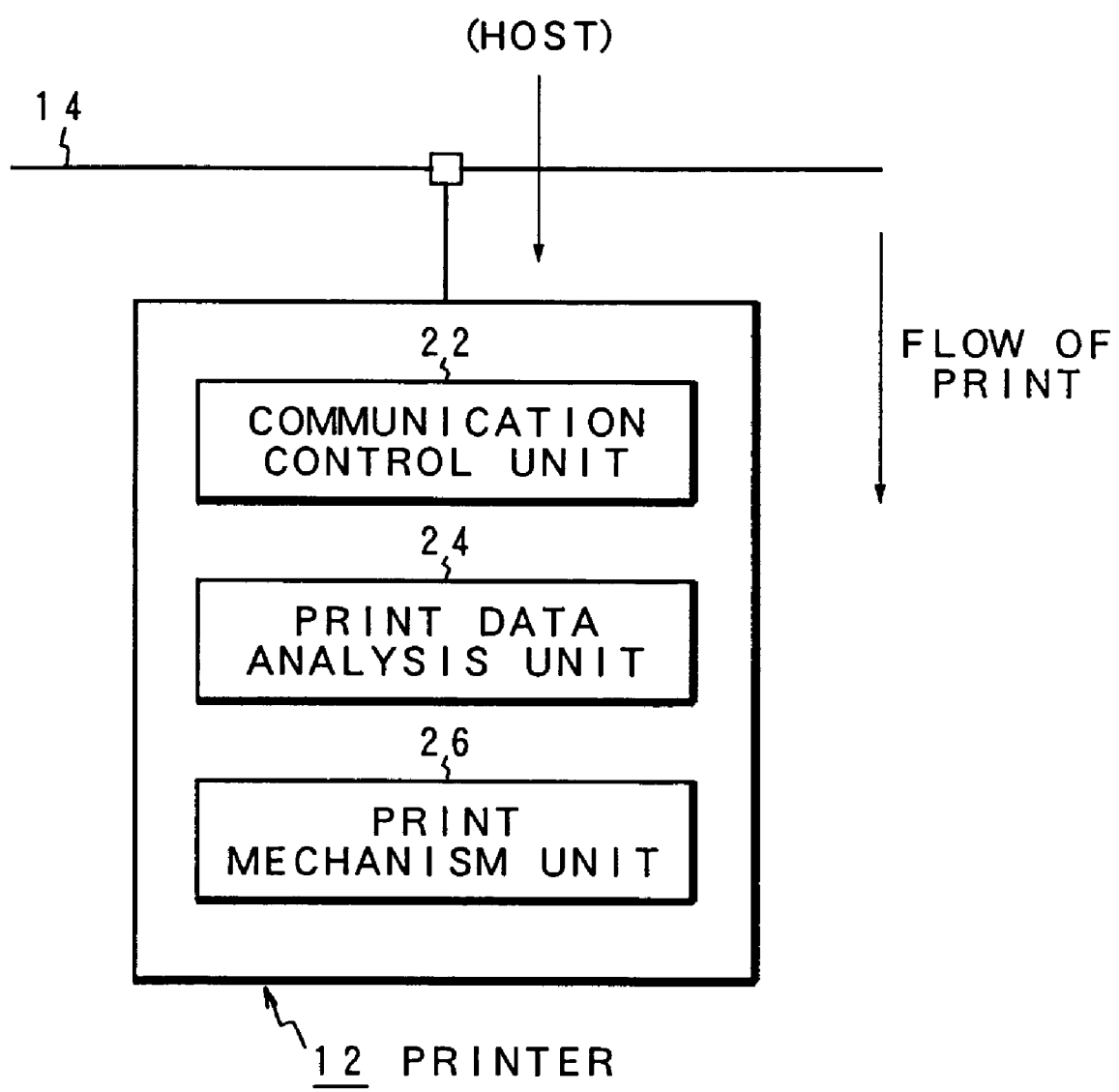
FIG. 3 is an explanatory diagram of the configuration of a printer of FIG. 1.

The printers of the printing system are each configured as shown in FIG. 3. The printer 12 comprises a communication control unit 22, a print data analysis unit 24 and a print mechanism 26. The communication control unit 22 provides a protocol control for interchanging print data between the host 10 and the printer. The print data analysis unit 24 is a part corresponding to an emulator for analyzing the print data prepared by the host 10, on the basis of a command. The print mechanism 26 is a printer engine for printing data on paper. Ordinary print in this printer 12 is effected in a flow from the host 10 through the communication control unit 22 and the print data analysis unit 24 toward the print mechanism 26.

Figure 4:
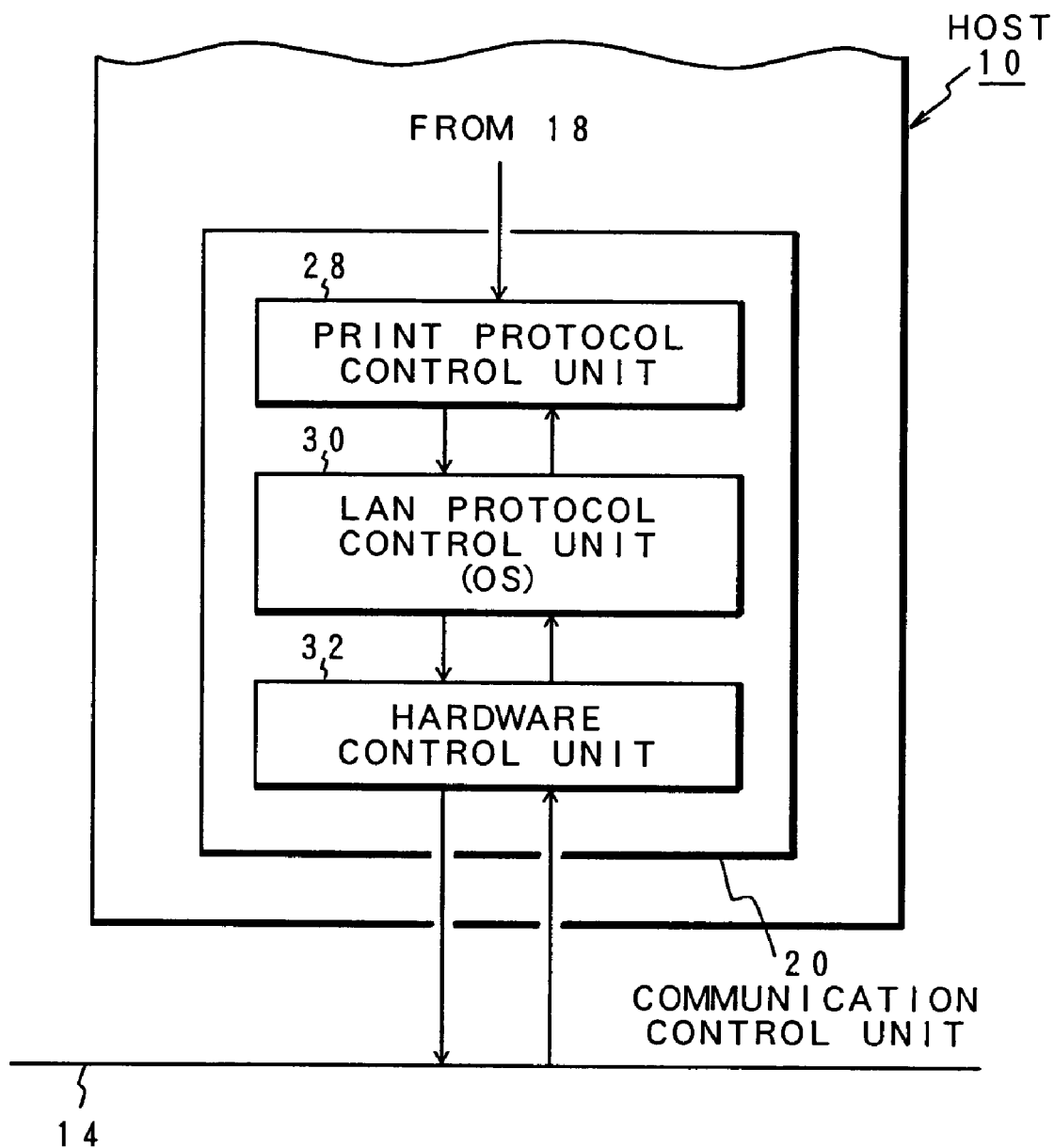
FIG. 4 is an explanatory diagram of a communication control unit on the host side of FIG. 2.
Figure 5:
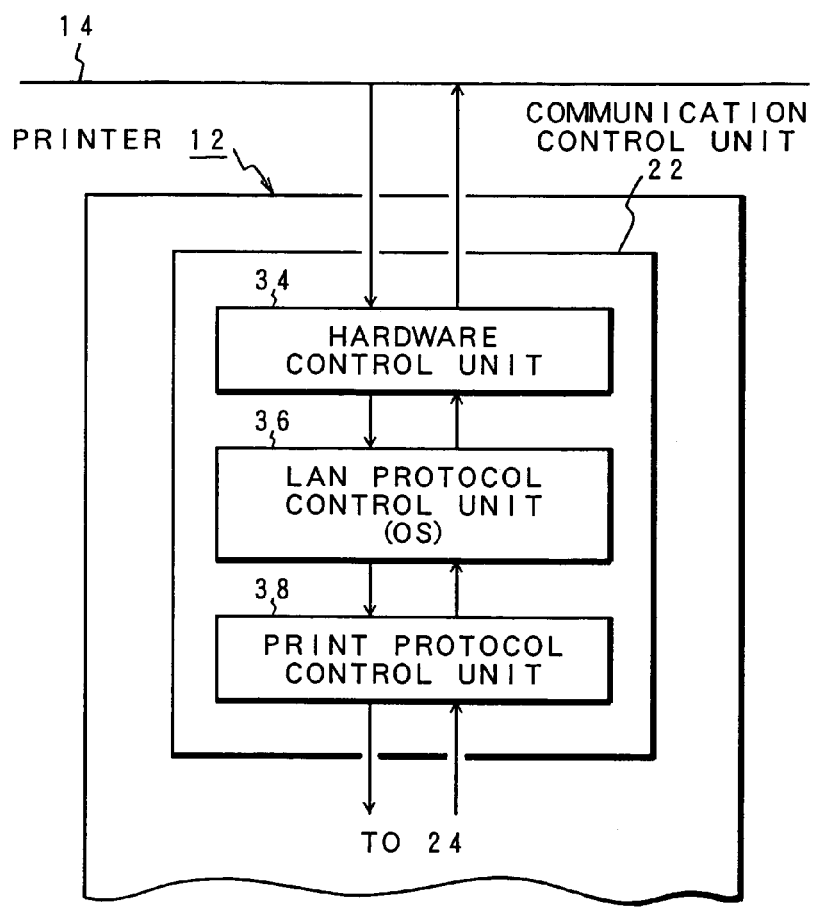
FIG. 5 is an explanatory diagram of a communication control unit on the printer side of FIG. 3.

The communication control unit 20 of the host and the communication control unit 22 of the printer are configured as shown in FIGS. 4 and 5, respectively. The host and printer communication control units 20 and 22 include print protocol control units 28 and 38, LAN protocol control units 30 and 36, and hardware control units 32 and 34, respectively. The hardware control units 32 and 34 make a direct access to a transmission path medium such as a LAN board. In response to data from the LAN protocol control units 30 and 36, the hardware control units 32 and 34 allow an actual sending and reception of a packet to and from the LAN to perform processing for posting the LAN protocol control units 30 and 36 on the data.

Figure 6:
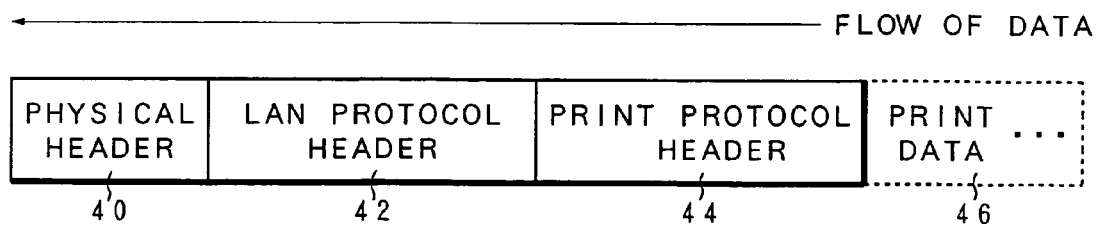
FIG. 6 is an explanatory diagram of the configuration of a packet on a LAN which is interchanged between the host and the printer.

FIG. 6 shows a configuration of a packet that is interchanged on the network 14 of the printing system of the present invention and that is made up of a physical header 40, a LAN protocol header 42, a print protocol header 44, and print data 46 added if necessary. For interchange of the packet on the network, an access to the physical header 40 is made for processing.

Referring again to FIGS. 4 and 5, the LAN protocol control units 30 and 46 correspond specifically to processing units for TCP/IP, UDP/IP, etc., and may typically be incorporated in an operating system so as to act as a partial function of the operating system. These LAN protocol control units 30 and 36 are used by an unspecified number of application layers and are not limited to print use. The LAN protocol control units 30 and 36 have access to the LAN protocol header 42 of the packet of FIG. 6 to perform processing. As used herein, the application soft defines one-upper layer of the transport layer in the seven layers of the OSI. In case of the TCP/IP and UDP/IP for example, it is one-upper layer of the TCP layer or UDP layer, and specifically a layer positioned at the same level of hierarchy as the Telnet header or ftp header. Furthermore, the print protocol control units 28 and 38 are sections for performing the protocol defined for print only and have access to the print protocol header 44 in the header of FIG. 6 for processing. In the following description, the case is given by way of example for more specific description where the UDP/IP is used as the LAN protocol, although other protocols may be used. Also as to the print protocol header 44 actually interchanged between the host and the printer, the header stored information is definitely shown by way of example for more specific description, although the format can be free as long as the functions of the present invention are implemented. The other required additional information may be provided.

Figure 7:
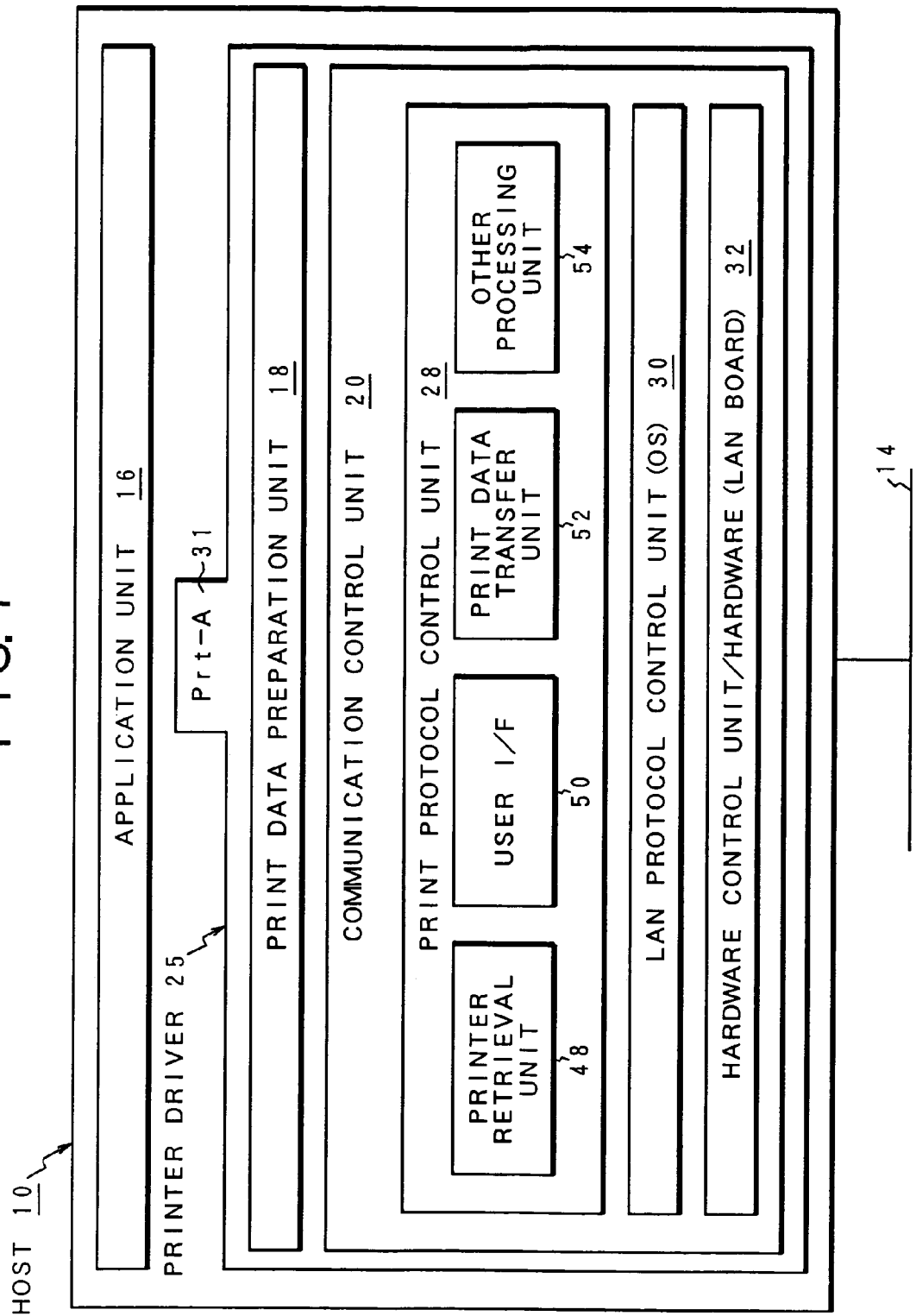
FIG. 7 is an explanatory diagram of the detailed configuration of the host side.
Figure 8:
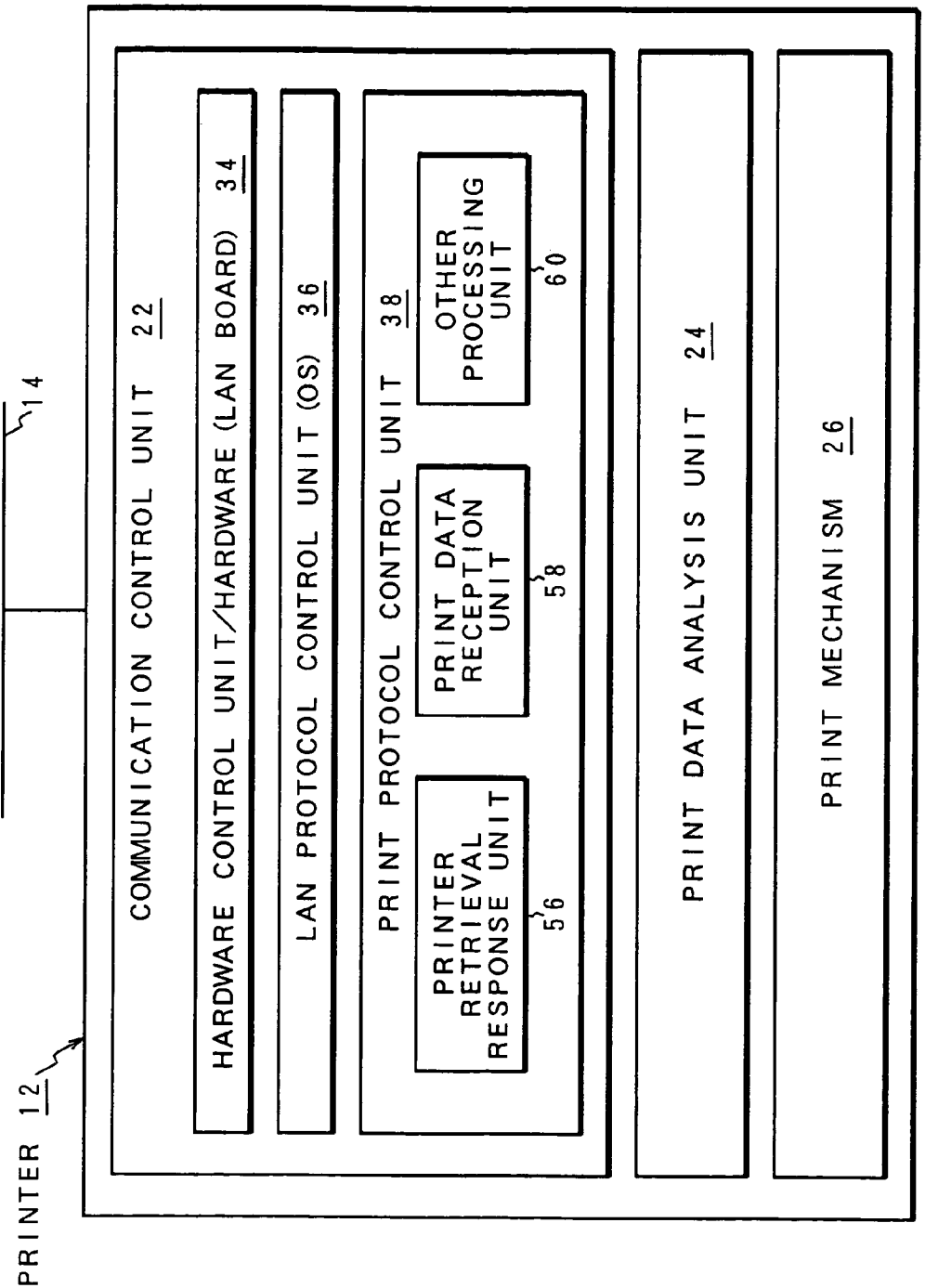
FIG. 8 is an explanatory diagram of the detailed configuration of the printer side.

FIG. 7 shows the details of the configuration of the host 10 of FIGS. 2 and 4. FIG. 8 shows the details of the printer configuration of FIGS. 3 and 5. The host 10 of FIG. 7 is constructed from the application 16, the print data preparation unit 18 and the communication control unit 20. In case of defining the printer on the host 10, the print data preparation unit 18 and the communication control unit 20 there among are defined as a pair of drivers 25. That is, with the print data preparation unit 18 and communication control unit 20 as the driver pair 25, the host 10 defines as a single abstract printer the port 30 that results in an output path to the actual printer Prt-A. In this manner, it will suffice on the host 10 to define only the single abstract port 30 as the printer, without any need to set printer information on the actual destination in the definitions of the port 30. As a result of this, the application 16 can see only the printer in the form of the port 30 defined as Prt-A. In the print protocol control unit 28 of the communication control unit 20 provided in the driver 25 resulting in the printer comprised of only the port 30 when viewed from the application 16, the present invention is provided with a printer retrieval unit 48, a user interface 50, a print data transfer unit 52 and an other processing unit 54. When a demand for print actually occurs in the application 16 to allow a request for print to be issued to the port 30, the printer retrieval unit 48 sends a broadcast or multicast printer retrieval packet of FIG. 9 to retrieve an active printer from the network. The broadcast or multicast packet is a packet which is defined as being received by all devices connected to the network. Upon receipt of this packet, the device if necessary fetches it internally to continue the subsequent processings, but if unnecessary discards the packet. The broadcast or the multicast is defined by a physical header 40-1 and a LAN protocol header 42-1 of FIG. 9 whose specifications are prescribed as the known contents. In case of using the UDP or TCP, the port number needs to be defined in order to ensure the inter-device communication. Herein the port number XXXX is used for explanation. In the printer retrieval packet of FIG. 9 to be sent upon the printer retrieval by the host 10, the print protocol header 44-1 includes a retrieval request 62, host communication information 64, emulation information 66 and additional information 68. The retrieval request 62 is provided with an identifier indicative of a request for printer retrieval. The host communication information 64 is provided with information required for the execution of communication between the printer and the host such as the host 10 IP address and port number. The emulation information 66 is provided with a print data command system such as PostScript or PCL information. Furthermore, the additional information 68 is provided with various types of information attendant on the printing operation. This printer retrieval packet is a broadcast or multicast packet and specifies XXXX as the port number of the printer side which is the other party of the communication. When receiving the packet addressed to the port number XXXX, the printer verifies the type of the emulation supported by itself, the current print status, etc., and if it is in its printable state, sends a response packet as in FIG. 10 to the host. This response packet is constructed from a physical header 40-2, a LAN protocol header 42-2 and a print protocol header 44-2. The print protocol header 44-2 includes response information 70, printer communication information 72, print possible/impossible information 74 and additional information 76. The response information 70 is provided with an identifier indicative of response information to a retrieval request. The printer communication information 72 is provided with information required for communication between the host and the printer such as the printer IP address and the port number. The print possible/impossible information 74 is provided with a judgment flag indicative of whether the print is possible or impossible. Furthermore, the additional information 76 is provided with various types of information attendant on the printing operation.

Figure 9:
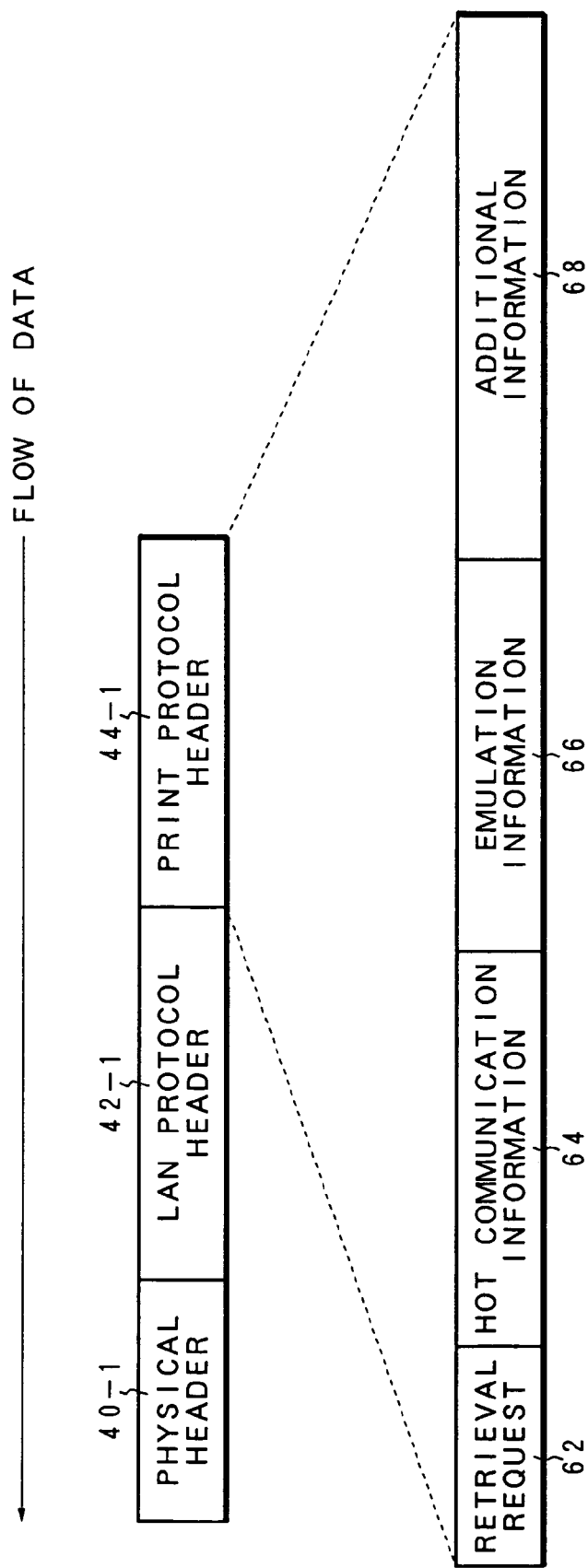
FIG. 9 is an explanatory diagram of a printer retrieval packet from the host.
Figure 10:
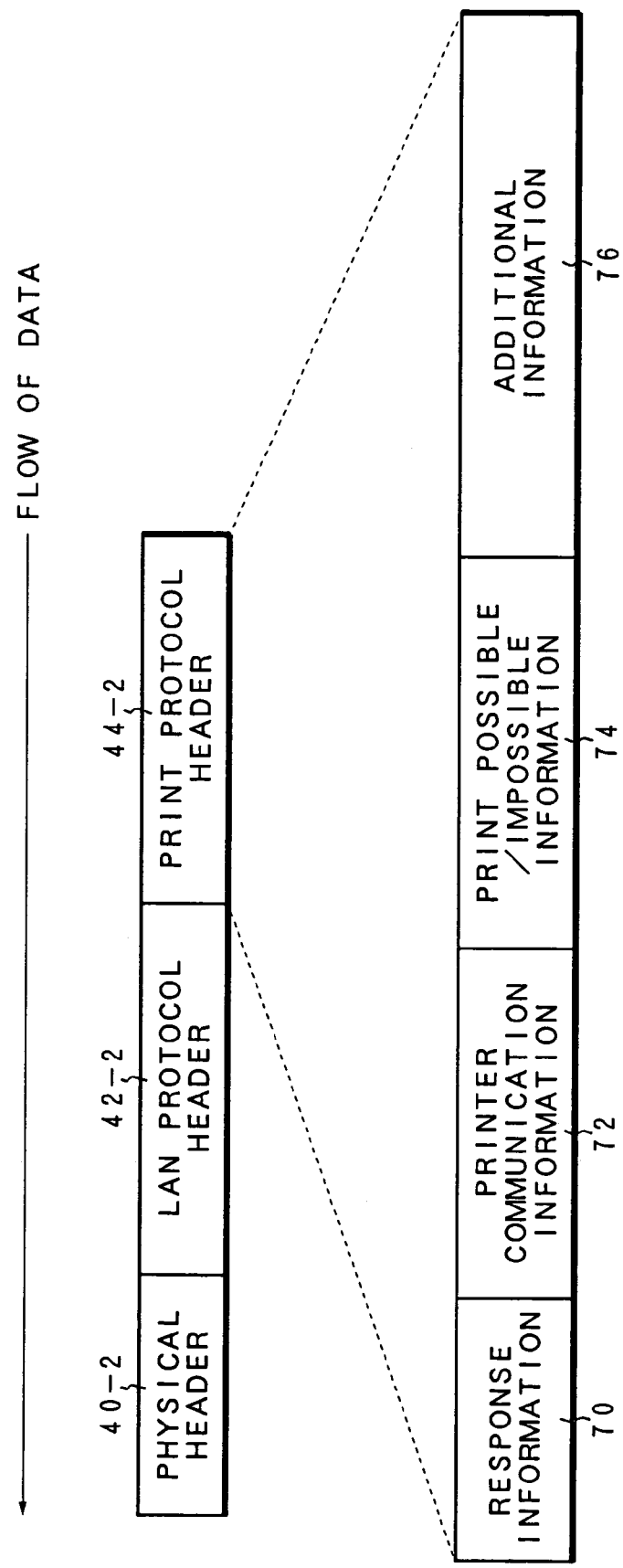
FIG. 10 is an explanatory diagram of a response packet from the printer to a retrieval from the host.

The response packet from the printer of FIG. 10 is a unicast packet whose party of communication is determined. Information on the host, i.e., the party of communication is contained in the host communication information 64 of the retrieval packet sent from the host of FIG. 9 so that the printer side can readily acquire the host information.

Figure 11:
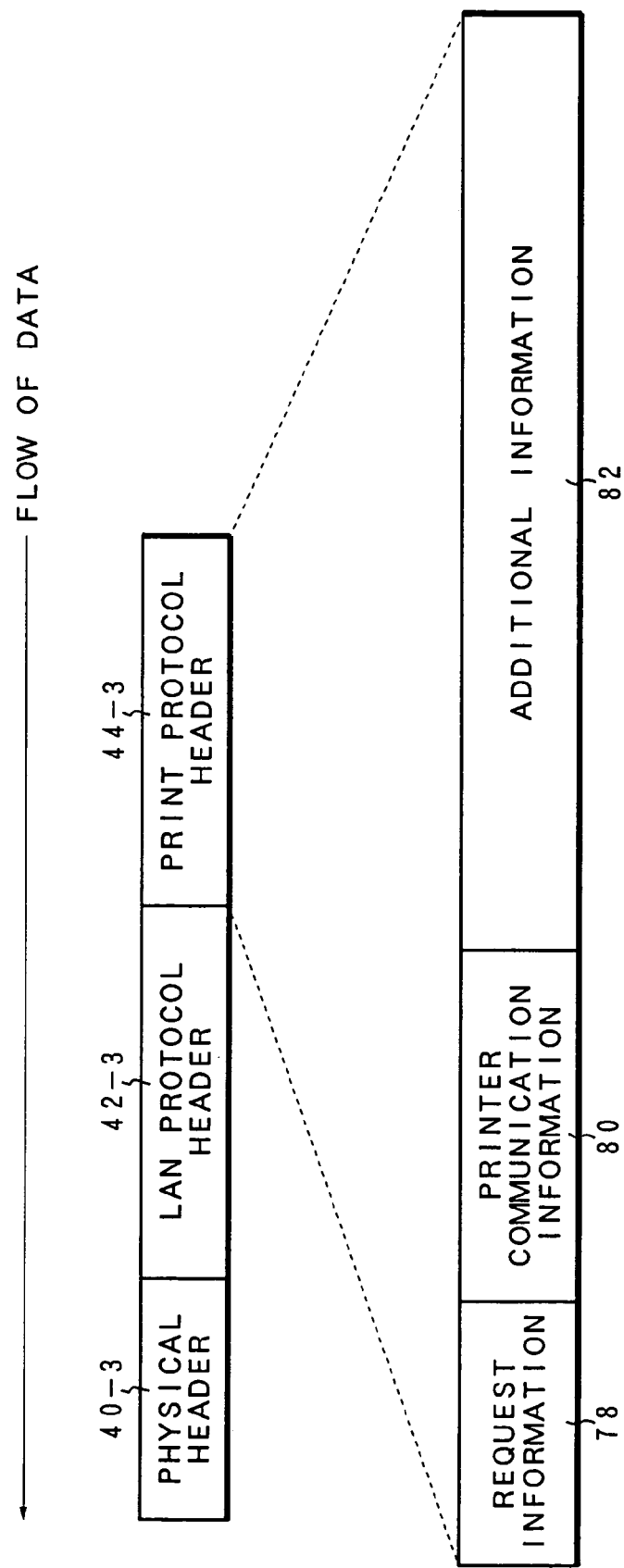
FIG. 11 is an explanatory diagram of a print request packet from the host.

In the event of presence of a plurality of printers on the network, the printer side may possibly issue a plurality of response packets of FIG. 10 in response to a single printer retrieval packet from the host of FIG. 9. For this reason, the host waits for a response from the printer for a certain period of time after the sending of the printer retrieval packet, to select as the printer for use in the actual print a printer that has first sent the response packet and that is enabled for print, to issue a print request packet as in FIG. 11. The print request packet is constructed from a physical header 40-3, a LAN protocol header 42-3 and a print protocol header 44-3. The print protocol header 44-3 includes request information 78, printer communication information 80 and additional information 82. The request information is provided with an identifier indicative of a request for print. The printer communication information 80 is provided with information for communication between the host and the printer such as the printer IP address and port number. The additional information is provided with various types of information attendant on the printing operation. Similar to the printer retrieval packet of FIG. 9, the print request packet from the host is sent in broadcast or multicast. When receiving the print request packet of FIG. 11, the printer recognizes that it is a print request, from the request information 78 of the print protocol header 44-3, and further refers to the communication information 80 of the printer. If the printer communication information 80 is the same information as set in the printer communication information 72 by itself with respect to the response packet to the printer retrieval of FIG. 10, then it recognizes that the host has selected it for use in the print, to send a response packet as in FIG. 12 to the host, ready for the print processing. In the event that upon the receipt of the print request packet of FIG. 11 the printer communication information 80 is different from the information of itself, the printer recognizes that the host has selected the other printer, and waits for the next request.

The response packet of FIG. 12 to the print request is constructed from a physical header 40-4, a LAN protocol header 42-4 and a print protocol header 44-4. The print protocol header 44-4 contains response information 82, printer communication information 84 and additional information 88. The response information 82 is provided with an identifier indicative of response information to a request for print. The printer communication information 84 is provided with information for communication between the host and the printer such as the printer ID address and port number. The additional information 88 is provided with various types of information attendant on the printing operation. In this embodiment, for the additional information 88 of the print protocol header 44-4 in the response packet to the print request of FIG. 12, a printer ID such as the printer name is set for specifying the printer. For this reason, when receiving the response packet of FIG. 12 from the printer, the host allows the printer ID such as the printer name set in the additional information 88 of the response packet of FIG. 12 to be displayed in, e.g., a GUI on the user interface by way of the user interface 50 provided in the print protocol control unit 28 of FIG. 7, to post the operator on the printer which actually performs the printing operation.

Figure 13A:
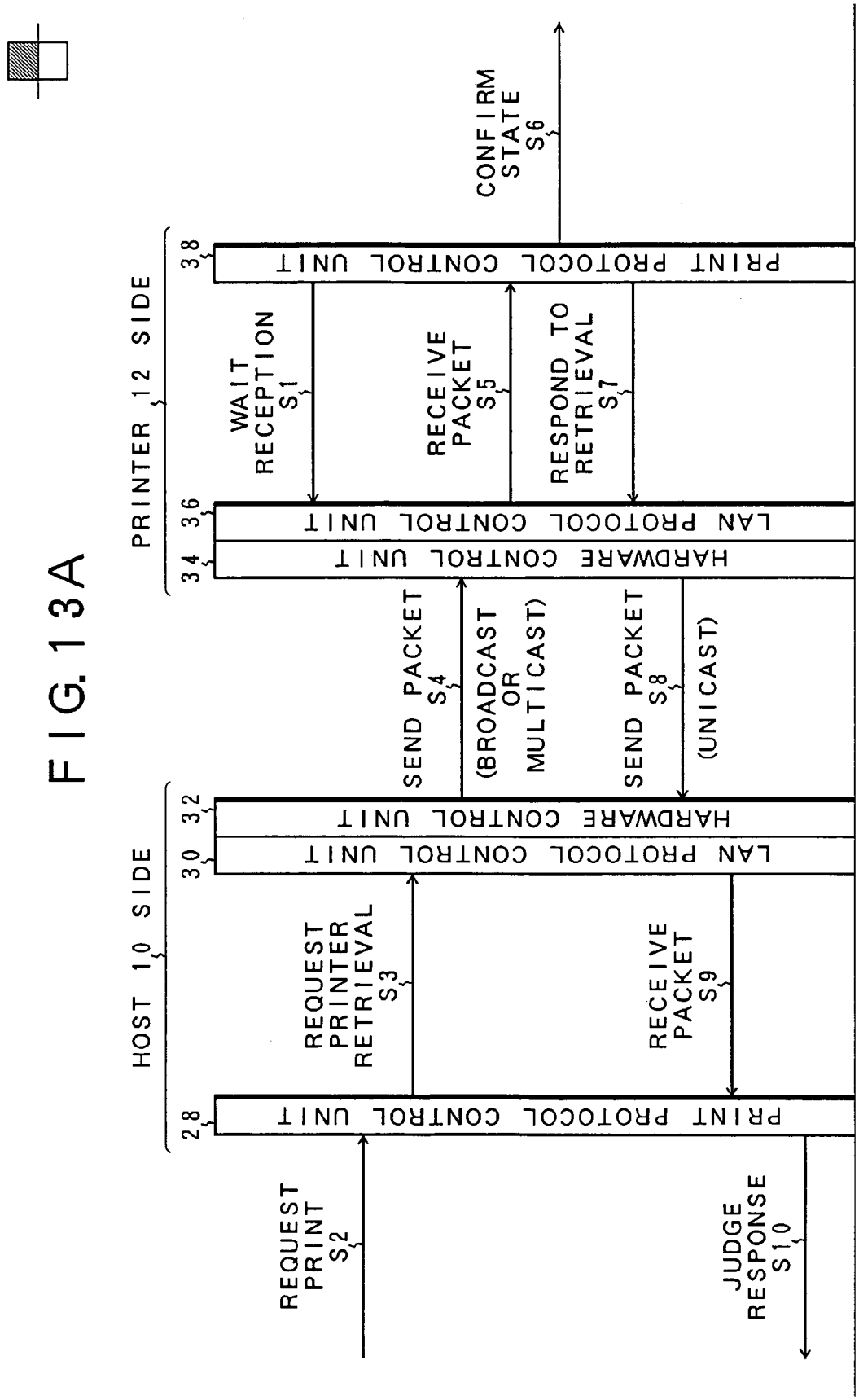
FIG. 13 is an explanatory diagram of a processing sequence between the host and the printer in accordance with a print protocol control of the present invention.

FIG. 13 shows in sequence the processing of the print control protocol effected by the host 10 of FIG. 7 and the printer 12 of FIG. 9. First, as in step S1 the printer 12 is in ordinary idling state, i.e., wait state for receipt of the printer retrieval from the host 10. When a request for print occurs on the host 10 in step S2, the host 10 issues a printer retrieval packet for retrieving a printer in step S3. The printer retrieval packet is a broadcast or multicast packet as in step S4. The printer 12 receives a printer retrieval packet from the host 10 in step S5, verifies the emulation type and the state of whether the print is feasible or infeasible in step S6, and issues a response packet to the printer retrieval from the host 10 in step S7. This response packet is a unicast packet as in step S8. The host 10 receives a retrieval response packet from the printer 12 in step S9. Due to the possibility of response from a plurality of printers, in step S10 it waits for a constant period of time to judge the packet responded and selects e.g., a printer which has made a response most rapidly and is enabled for print as a printer for use in the actual print. Then in step S11 it issues a print request packet. This print request packet is a broadcast or multicast packet as in step S12. The printer 12 accepts a print request packet from the host 10 in step S13 and judges in step S14 whether the printer 12 itself has been selected or not. For the judgment, comparison is made with the communication information of the printer 12 itself set in the response packet of step S7. If it coincides with the communication information of the print request packet, then the printer 12 itself is judged as selected, allowing a response packet to the print request from the host to be issued in step S15. This response packet is a unicast packet as in step S16. Unless the communication information of the print request packet coincides with the communication information of the printer 12 itself, it is judged that the printer 12 itself has not been selected, allowing a return to the idle state in step S1. The host 10 accepts a print response packet from the printer 12 in step S17 and, after the display for the operator of information such as the printer name, enters the print processing of step S19.

Figure 14A:
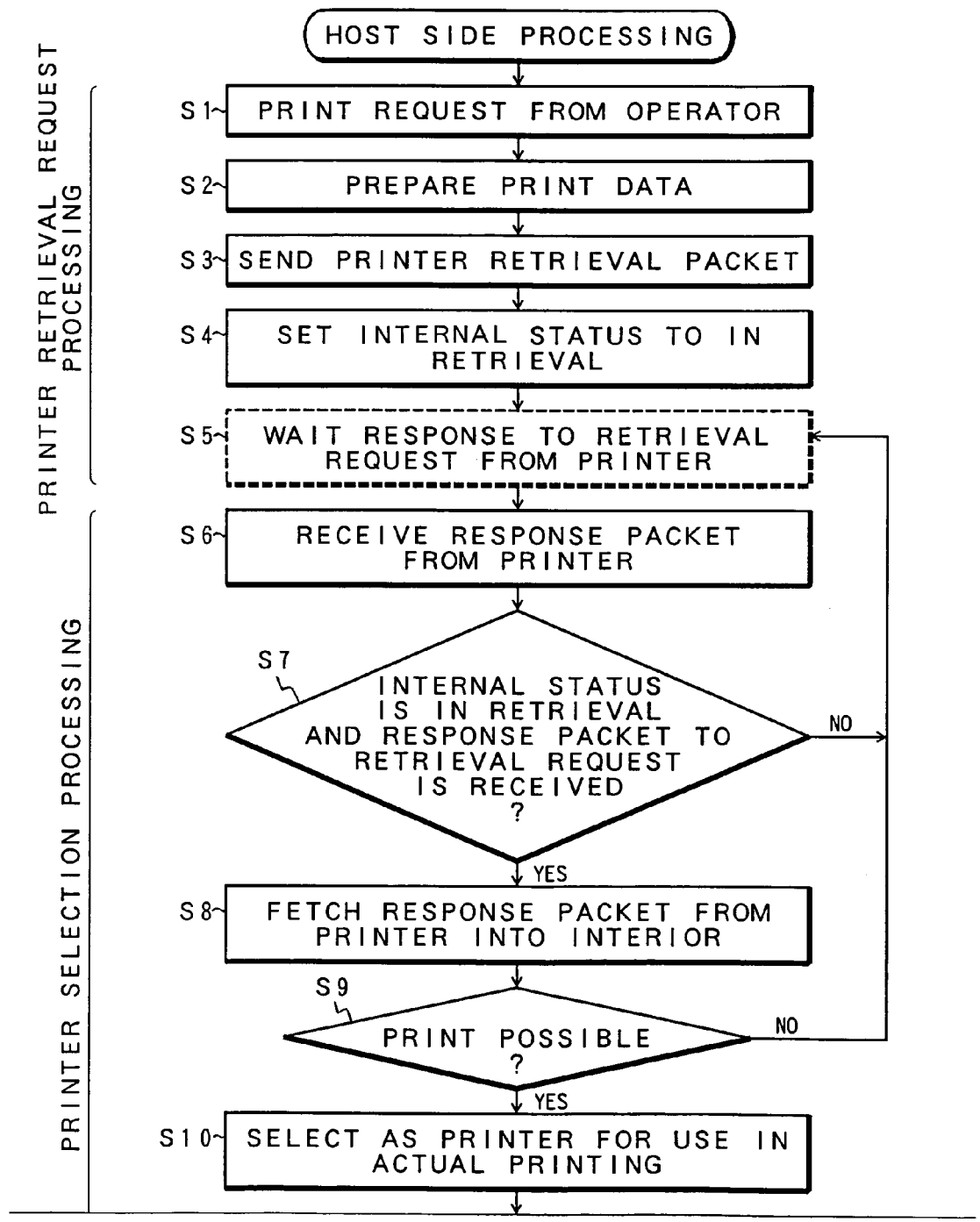
FIGS. 14A and 14B are flowcharts of the print protocol control of the host side in accordance with the present invention.
Figure 14B:
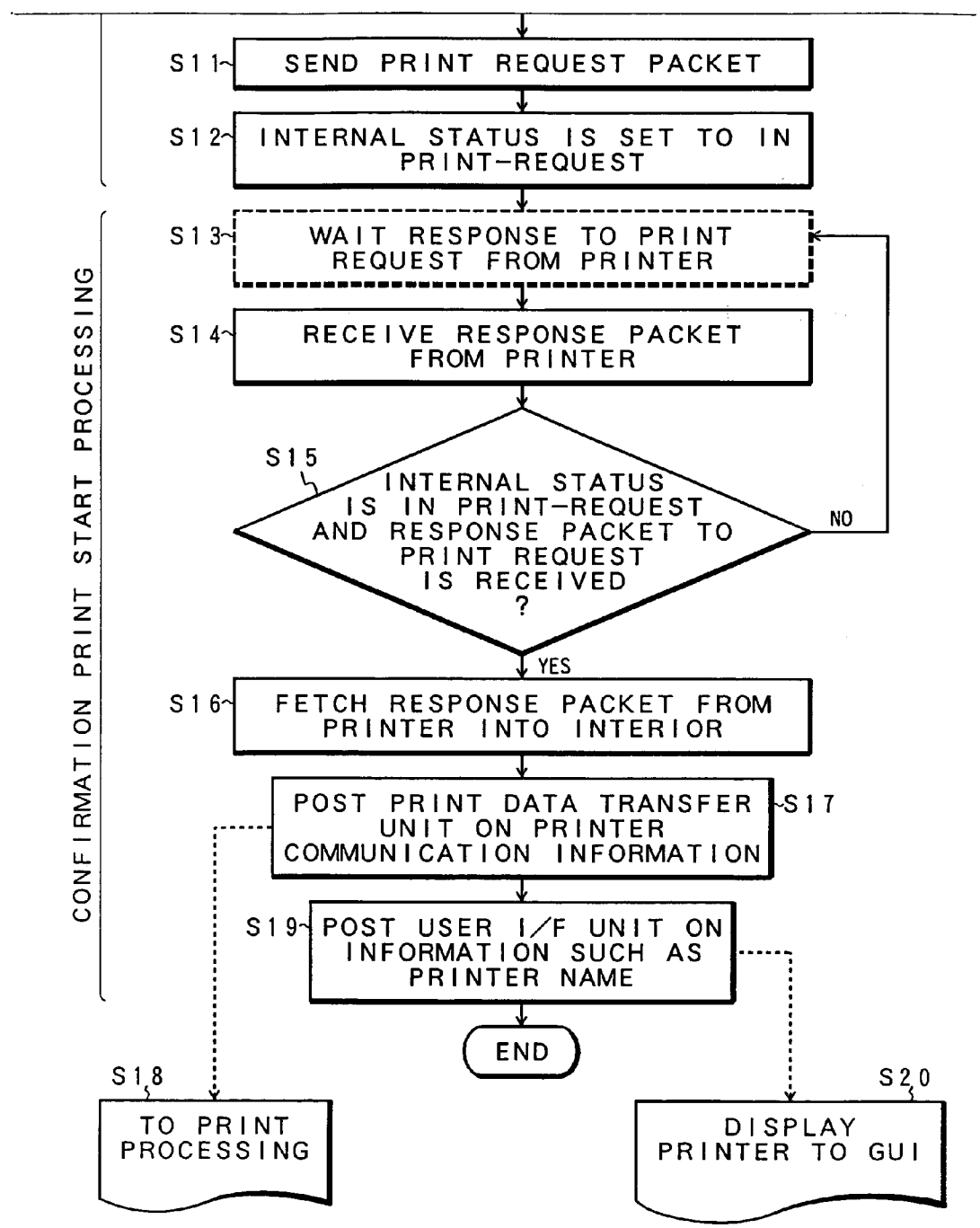

Referring then to flowcharts of the host side processing of FIGS. 14A and 14B and the printer side processing of FIGS. 15A and 15B, description will be made of the detailed operations of the printing system of the present invention. In FIGS. 14A and 14B, when a request for print from the operator occurs on the host in step S1, the application 16 of the host 10 of FIG. 7 posts the print data preparation unit 18 on the request for print by way of the port 30, and print data are prepared in step S2. When the print data are prepared in step S2, for the printer retrieval on the network in step S3 the printer retrieval unit 48 provided in the print protocol control unit 28 of the communication control unit 20 of FIG. 7 sets the identifier indicative of the print request of the print protocol header 44 of FIG. 9, the host communication information 64, specifically the host 10 IP address and port number, and emulation types contained in the emulation information 66, and sends the printer retrieval packet to the network by use of the broadcast or the multicast. After the completion of the printer retrieval packet, the host 10 changes the internal status to "in-retrieval" in step S4. Then in step S5, the host 10 is put in its response wait state of the response packet to the retrieval request from the printer for the printer retrieval packet sent to the network. The processings of steps S1 to S5 of FIG. 15 result in printer retrieval request processing effected by the host.

Figure 15A:
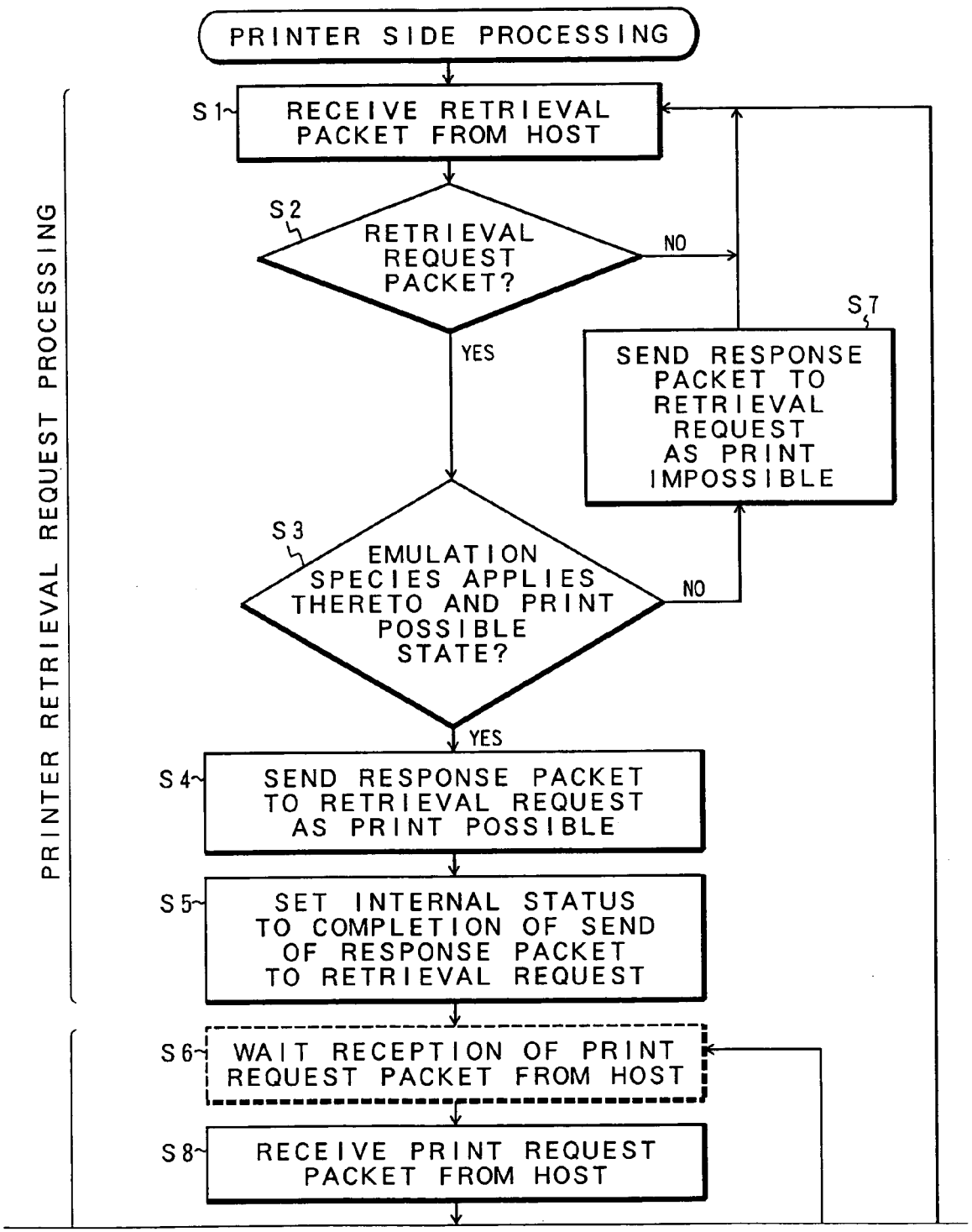
Figure 17:
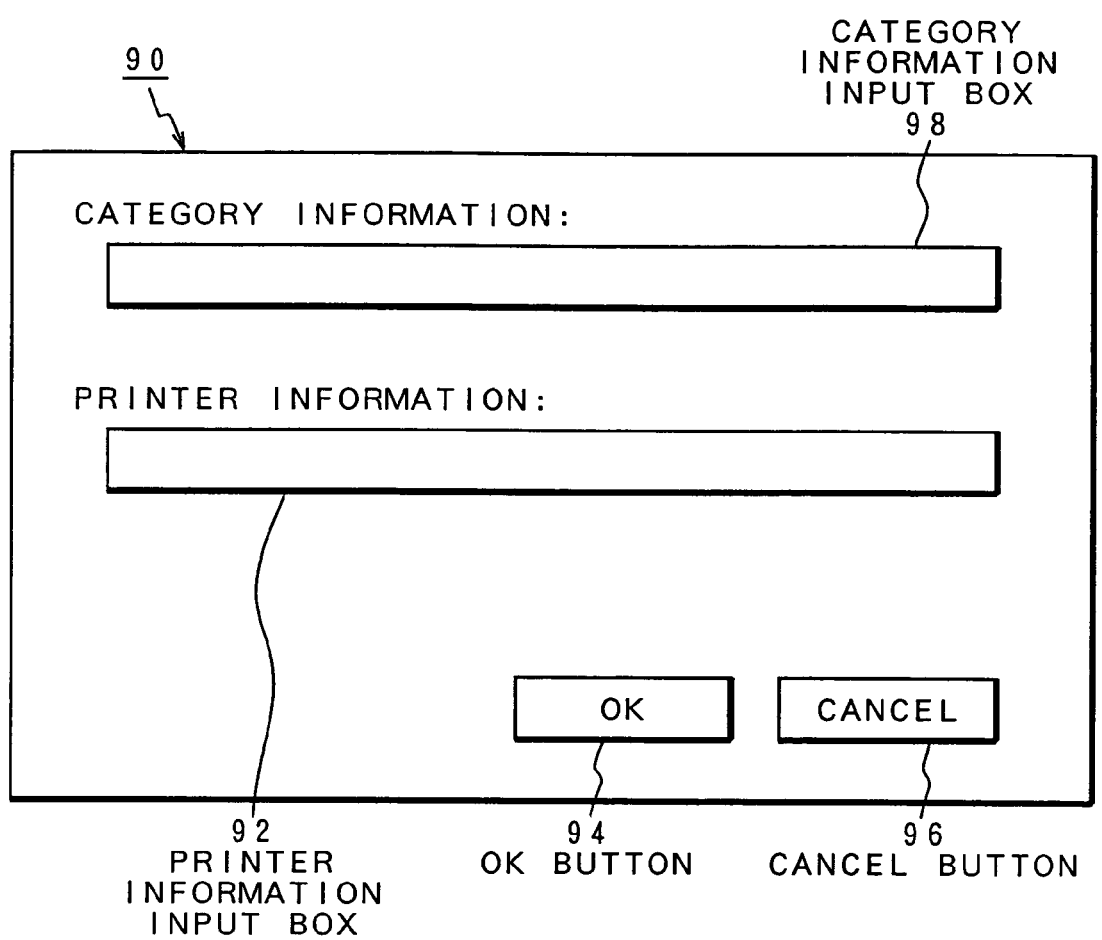
FIG. 17 is an explanatory diagram of a printer information setting screen for designating a printer by the host side on the basis of the category information and the printer information.

In step S1 of FIG. 15A, the printer on the other hand accepts a printer retrieval packet from the host by the hardware control unit 34, the LAN protocol control unit 36 and the print protocol control unit 38 of FIG. 7 in the mentioned order and judges the contents of the received packet by a printer retrieval responding unit 56. More specifically, when the printer retrieval responding unit 56 verifies the identifier for the retrieval request within the packet received from the host in step S2, it goes to step S3 to verify the information such as the emulation types set in the same packet and to judge whether the printer itself is enabled for print from the internal information of the printer itself. In case the printer has received a packet other than the retrieval request, it ignores that packet, allowing a return to the retrieval packet wait in step S1. If the printer itself judges to be enabled for print in step S3, then the procedure goes to step S4 to set the identifier of the response information 70 for the retrieval request with respect to the contents of the print protocol header 44-2 of the response packet as in FIG. 10, the printer communication information 72 such as the IP address and the port number, and the flag indicative of the print enabled in the print possible/impossible information 74 and to send this response packet to the host. After the completion of sending of the response packet, the procedure goes to step S5 in which the printer sets the internal status to "completion of send of response packet to retrieval request". Then in step S6 it waits for receipt of the print request packet as in FIG. 12 which will thereafter be sent from the host. If upon the receipt of the retrieval packet from the host the printer is currently in print or in erroneous operation, the printer cannot accept the print request, so that the procedure advances from step S3 to step S6 in which a flag indicative of the print disabled is set in the print possible/impossible information 74 of the response packet in FIG. 10, the response packet being sent to the host previous to a return to the wait for the retrieval packet receipt in step S1. Naturally, in the event of print disabled, the procedure may return intactly to the retrieval packet receipt wait without especially sending the response packet to the host. The unicast is used for the response packet sent from the printer to the host in step S4 or S7. In the event of presence of a plurality of printers on the network, the plurality of printers send the response packets to the host. The processings of steps S1 to S7 of FIG. 17 are the response processing for the retrieval request from the host in the printer.

Referring again to FIGS. 14A and 14B which illustrate the host side processing, the host waiting for the response to the retrieval request from the printer in step S5 receives at any time the response packet from the printer in step S6 and verifies various types of information set in the response packet by the printer retrieval unit 48 of the print protocol control unit 28. In this embodiment, by way of example the host 10 has selective conditions for selecting a printer that responds most rapidly and that is enabled for print as the printer for use in the actual printing operation. When the host 10 receives a response packet from the printer 12, it verifies whether the status of the host itself is in retrieval or in other statuses in step S6. Since the host is in printer retrieval at that time, it judges only a response packet from the printer which is provided with an identifier indicative of the response to the retrieval request. The host then fetches the packet judged to be effective into the interior in step S8. In case of receiving a packet other than the response packet to the retrieval request in step S7, the host ignores the packet and returns to a wait for the response to the retrieval request from the printer in step S5. After internal fetching of the response packet from the printer in step S8, a check is made of the print possible/impossible information set in the response packet in step S9. If it recognizes that the print is feasible, then that printer is selected as a printer for use in the actual printing operation in step S10. On the contrary, if it recognizes that the print possible/impossible information set in the response packet indicates that the print is infeasible, then the procedure returns from step S9 to step S5 to again wait for the response packet receipt. The host 10 selects a printer for use in the actual printing operation in step S10, after which in step S11 it prepares a print request packet as in FIG. 11 for sending by use of the broadcast or multicast. This print request packet is provided with the IP address and port number of the printer selected for actual use in the printing operation in step S10, the IP address and port number being given as the printer communication information 80 of the print protocol header 44-3. After the completion of sending of the print request packet, the host changes the internal status during the print request in step S12. Then in step S13 of FIG. 14B, it waits for a response packet to the print request from the printer in order to issue a print request packet. The processings of steps S6 to S14 in FIGS. 14A and 14B result in printer selection request processing effected by the host.

In the printer side on the other hand, the printer receives a print request packet from the host in step S8 of FIG. 15A and verifies in step S9 whether the status of the printer itself is in the completion of send of response packet to the retrieval request or in the other status. Since the status is the completion of send of the response packet to the retrieval request in this case, judged as an effective packet is only the retrieval request packet from the host provided with the identifier indicative of the print request, which in turn is fetched into the interior in step S10. In case of receiving the other packet, that packet is ignored allowing a return to the wait for receipt of the print request packet from the host in step S6. The printer fetches the print request packet from the host in step S10, after which it verifies the printer communication information set in this packet in step S11. In the event that it coincides with the communication information of the printer itself, i.e., that the response packet issued in step S4 contains the same information as the printer communication information set by printer itself, the procedure goes to step S14 of FIG. 15B in which the host recognizes that the host has selected that printer for the printing operation. If the printer recognizes in step S14 that the printer itself has been selected, the procedure goes to step S15 in which for the print protocol header 44-4 of the response packet as in FIG. 12 there are set the identifier indicative of the response information 82 to the print request, the printer communication information 84, and the other additional information 88 such as the printer name for example, this response packet being sent to the host. Then in step S16 the internal status is changed to "selected", preparing for the subsequent actual printing processing from the host. On the contrary, if the printer communication information is not coincident with the printer itself in step S11, then the procedure goes to step S12 in which it recognizes that the printer other than itself has been selected for the printing operation without making any response to the host in particular. Then in step S13, the internal status is restored to its initial status, again allowing a return to the wait of receipt of the retrieval request packet from the host in step S1. Such processings of steps S8 to S16 of FIGS. 15A and 15B result in the selection response processing effected by the printer.

Then, the host side receives a response packet from the printer which has received the print request in step S14 of FIG. 15B, and verifies in step S15 whether the status of itself is in print request or in the other status. Since it is in print request in this case, the procedure goes to step S16 in which the host judges as an effective packet only the response packet from the printer provided with the identifier indicative of the response to the print request, for fetching thereinto. If the other packet is received, then that packet is ignored allowing a return to the response packet receipt wait in step S13. The host receives the response packet to the print request from the printer in step S16, after which in step S17 the host posts the print data transfer unit 52 within the host 10 on it to allow the print data transfer unit 52 to start the printing processing in step S18. At the same time, in step S19 the host posts the user interface 50 of FIG. 7 on e.g., the printer name as the additional information set in the response packet from the printer to the print request, so that in step S20 the user interface 50 displays e.g., the printer name as the additional information in the GUI, etc., and posts the operator on the printer as the actual output target. Such steps S14 to S21 of FIG. 15B result in the validation print starting processing effected by the host side.

Figure 16:
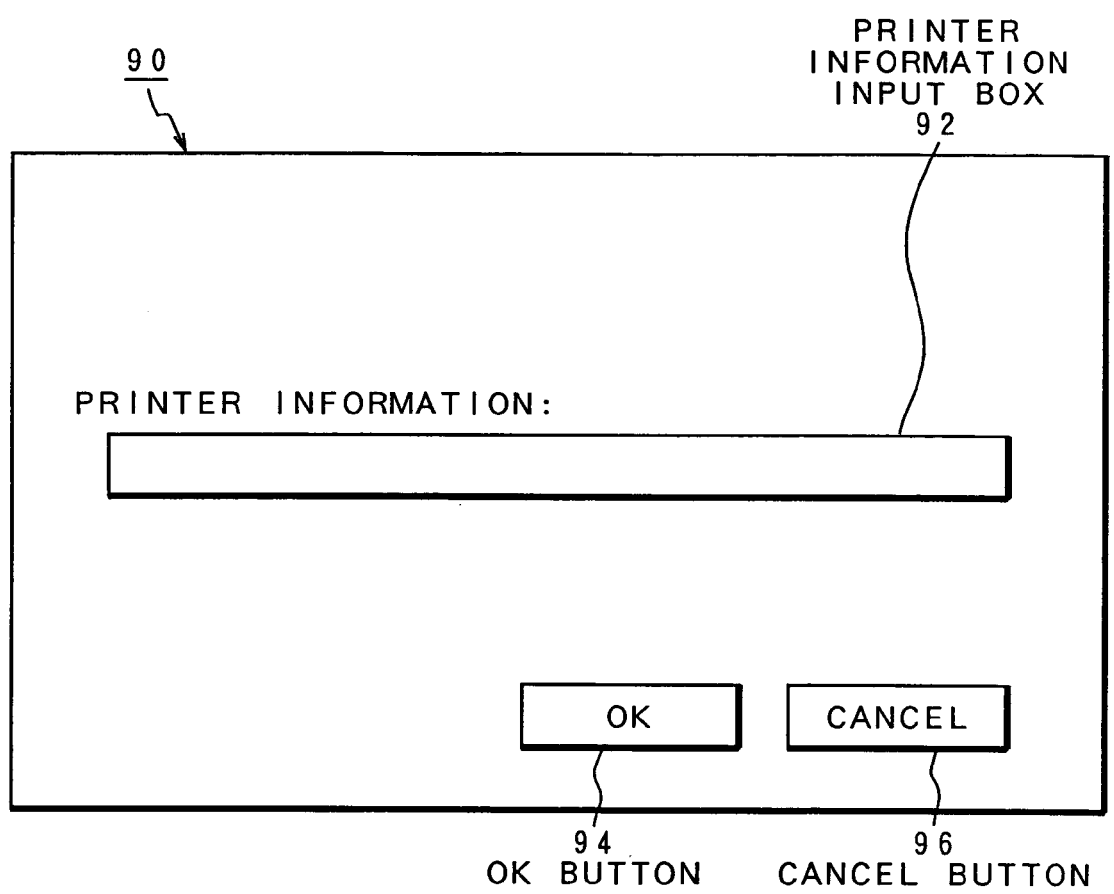
FIG. 16 is an explanatory diagram of a setting screen for designating a printer by the host side on the basis of the printer information.

Description will then be made of another embodiment of the printing system of the present invention in which upon the print request by the operator on the host, a printer performing the actual printing operation is designated by a printer ID such as the printer name so that the printer can automatically be detected from this printer designation information for printing. In order to implement the printer automatic detection printing based on the printer designation by the operator, a printer information input screen as shown in FIG. 16 is displayed on the host when the operator performs the printing so that the operator can enter the printer information. A printer information input screen 90 comprises a printer information input box 92, an OK button 94 and a cancel button 96. The operator enters the printer information desired to perform the actual printing into the printer information input box 92. Any printer information can be entered irrespective of the types as long as it is unique one allowing the distinguishment from the other printer. The printer information can appropriately include for example a printer placement site, a manager name, a printer name, a printer type, a printer IP address or MAC address, a printer introduced date, a printer firmware version, a printer total number of print, a size of paper set in the printer. Another embodiment of setting of the printer information may use the printer information input screen 90 of FIG. 17. This printer information input screen 90 further comprises a category information input box 98 positioned above the printer information input box 92. The provision of such category information input box 98 enables the printer information to be set after the designation of the category information. Although FIGS. 16 and 17 show the method of inputting printer information and category information, another method may be employed which uses the popup menu or the like for the selection of the printer. Anyway, as long as the host can designate the conditions for the printer retrieval, the present invention is applicable to any printer information based designation. Information corresponding to such printer information designated on the host is set on the printer side in advance. The setting of the printer information into the printer is performed through the operator panel or by the setup tool by way of the network.

Figure 18A:
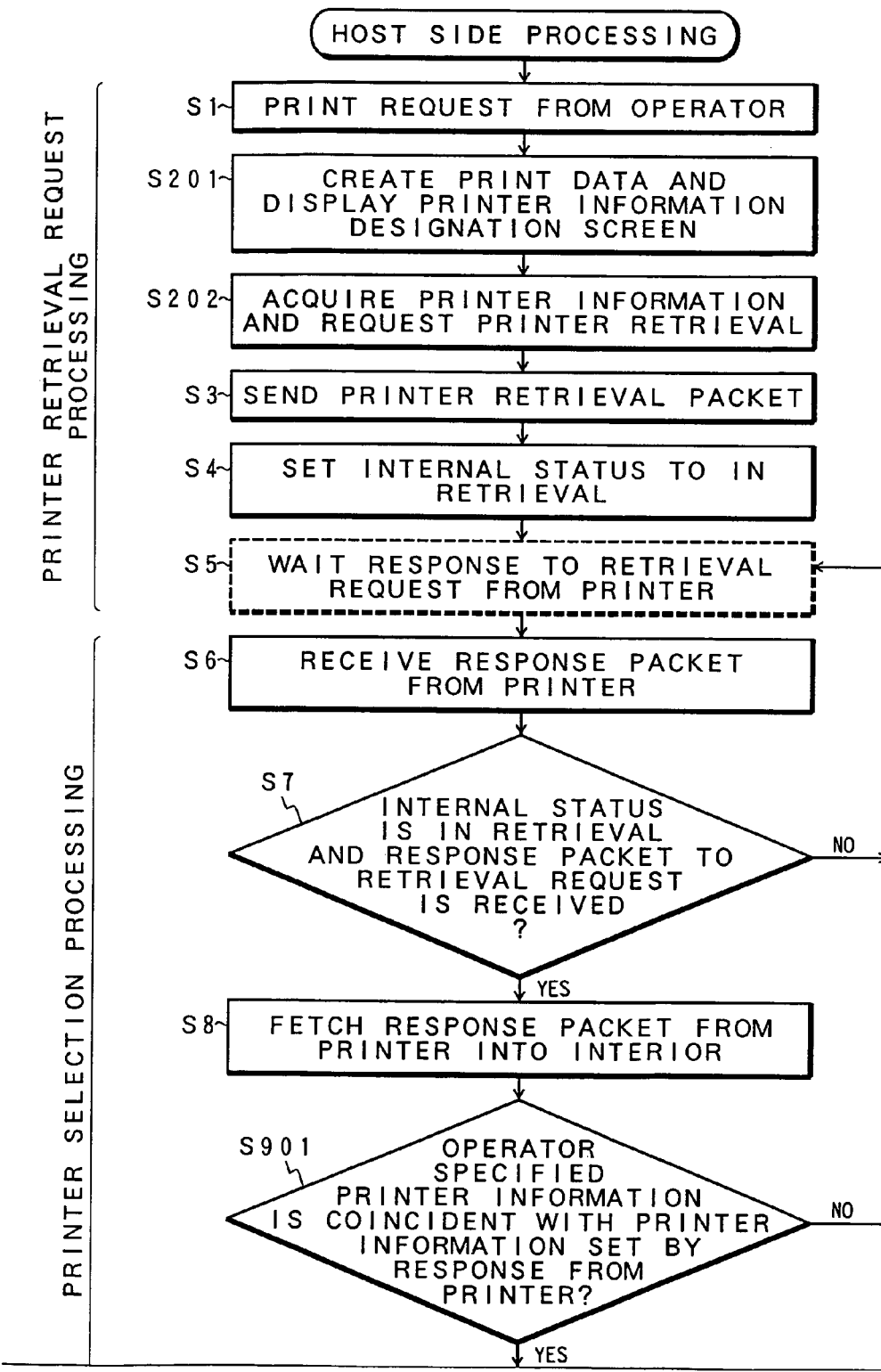
FIGS. 18A and 18B are flowcharts of the host side print protocol control in accordance with the present invention for designating a printer by the host side.
Figure 18B:
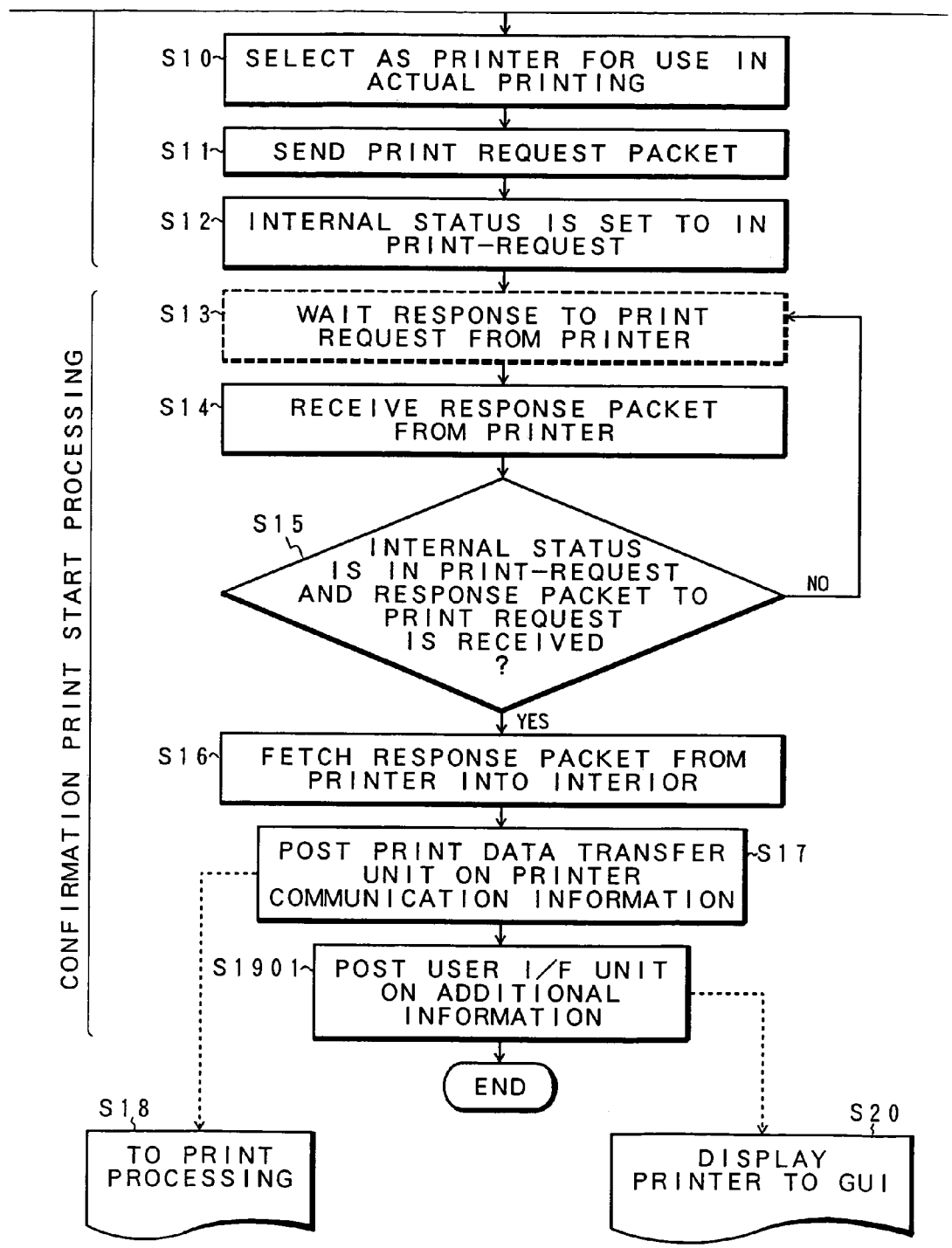

Referring then to FIGS. 18A and 18B which illustrate the host side processing flowchart and to FIGS. 19A and 19B which illustrate the printer side processing flowchart, detailed description will be made of the processing of the printing system in accordance with the present invention in which the operator designates the printer information the operator desires to actually print as in FIGS. 16 and 17. When a print request from the operator occurs on the host in step S1 of FIG. 19A, the application 16 of FIG. 7 posts the print data preparation unit 18 on the print request by way of the port 30. After the preparation of the print data by the print data preparation unit 18 in step S201, the user interface 50 provided in the print protocol control unit 28 within the communication control unit 20 displays the printer information input screen 90 as in FIG. 16 or 17. At that time, the operator inputs any printer information for specifying the printer by means of which the operator desires to print. Assume that for example the operator has input "5$^{th}$ floor office" as the printer placement site of the printer information. The host acquires the input of printer information from the operator in step S202, after which in order to retrieve the printer on the network, the printer retrieval unit 48 provided in the print protocol control unit 28 within the communication control unit 20 sets, for the printer retrieval packet as in FIG. 9, the identifier indicative of the retrieval request 62, the host receipt communication information 64 such as the host IP address or the port number, and the emulation type as the print data emulation information 66. Then in step S3, the printer retrieval packet is sent to the network by use of the broadcast or the multicast. After the completion of the send, the host changes the internal status to "in retrieval" in step S4. After the completion of the send of this printer retrieval packet, the host waits for the response packet to the retrieval request from the printer in step S5.

On the printer side on the other hand, in step S1 of FIG. 19A the printer retrieval packet from the host is received by the hardware control unit 34, the LAN protocol control unit 36 and the print protocol control unit 38 of FIG. 8 in the mentioned order. When in step S2 the printer verifies the identifier indicative of the retrieval request within the retrieval packet received by the printer retrieval response unit 56, it verifies information such as emulation type set in the packet in step S3 and judges whether itself is enabled for print from the its own internal information. If the printer receives the packet other than the retrieve request, that packet is ignored to allow a return to the retrieval packet receipt wait in step S1. If the print is judged to be enabled in step S3, then the procedure goes to step S401 in which for the response packet of FIG. 10 there are set the identifier indicative of the response information 70 to the retrieval request, the communication information 72 of the printer itself such as the printer IP address or the port number, the flag indicative of the print enabled as the print possible/impossible information 74, and additional information 76, the resultant response packet being sent to the host. The additional information 76 of the response packet to the host is information previously set correspondingly to the host-side designation of the printer by the operator. For example, correspondingly to the printer information "5$^{th}$ floor office" capable of being designated on the host side, the printer side sets the printer information "5$^{th}$ floor office" as the additional information, for sending send the response packet to the host. After the completion of the send of the response packet to the retrieval request, the internal status is changed to the completion of send of the response packet to the retrieval request in step S5 and the receipt of the print request packet from the host is waited for in step S6. In the event that the printer is currently in print or in erroneous operation, the printer cannot accept any print request, so that it sets a flag indicative of the print disabled as the print possible/impossible information 74 of the response packet of FIG. 10. Then, in step S7 the printer sends this response packet to the host, after which it returns to step S1 to wait for the retrieval packet receipt. It is natural that in case of print disabled the procedure may directly return to the step S1 to wait for the retrieval packet receipt from the host without making any response to the host in particular.

Referring again to FIG. 18A on the host side, in the response wait status to the retrieval request from the printer in step S5, in the presence of a plurality of printers on the network, the host can receive response packets from the plurality of printers in step S6. When the host accepts the response packet from the printer at any time in step S6, the procedure goes to step S7 to verify the various information set in that response packet. Since the host sets the information "5$^{th}$ floor office" as the printer information designated by the operator, it selects as the printer for use in the actual printing operation the printer whose response packet additional information is provided with the information "5$^{th}$ floor office". In other words, when the host accepts a response packet from the printer, it verifies whether the status of itself is in retrieval or in the other status. Since the host is retrieving the printer, the host judges as the effective packet only a response packet from the printer provided with the identifier indicative of the response to the retrieval request and fetches it into the interior in step S8. If the host accepts the other packet, it ignores that packet, allowing a return to the response packet receipt wait in step S5. The host performs the internal fetching of the response packet from the printer in step S8, after which in step S9 it compares the additional information set in the response packet with the printer information requested by the operator in step S201. If both present the same information "5$^{th}$ floor office" so that the comparison results are coincident with each other, then that printer is selected in step S10 as the printer for use in the actual printing operation. If the printer information set by the operator and the response packet additional information do not coincide with each other, then the procedure goes back to step S5 to wait for the response packet receipt. The host selects the printer for use in the printing operation in step S10, after which in step S11 it sends the print request packet provided with the identifier indicative of the print request 78 of FIG. 11, the printer communication information 80 and the additional information 82 to the network in broadcast or multicast. Then in step S12 the host changes the internal status to "in print request". The printer communication information 80 set in print request packet issued in step S11 is the printer communication information itself set in the response packet to the retrieval request received from the printer. When the internal status is changed to the in print request in step S12, the procedure goes to step S13 in which the host waits for the receipt of the response packet to the print request from the printer after the send of the print request packet to the printer.

Figure 19B:
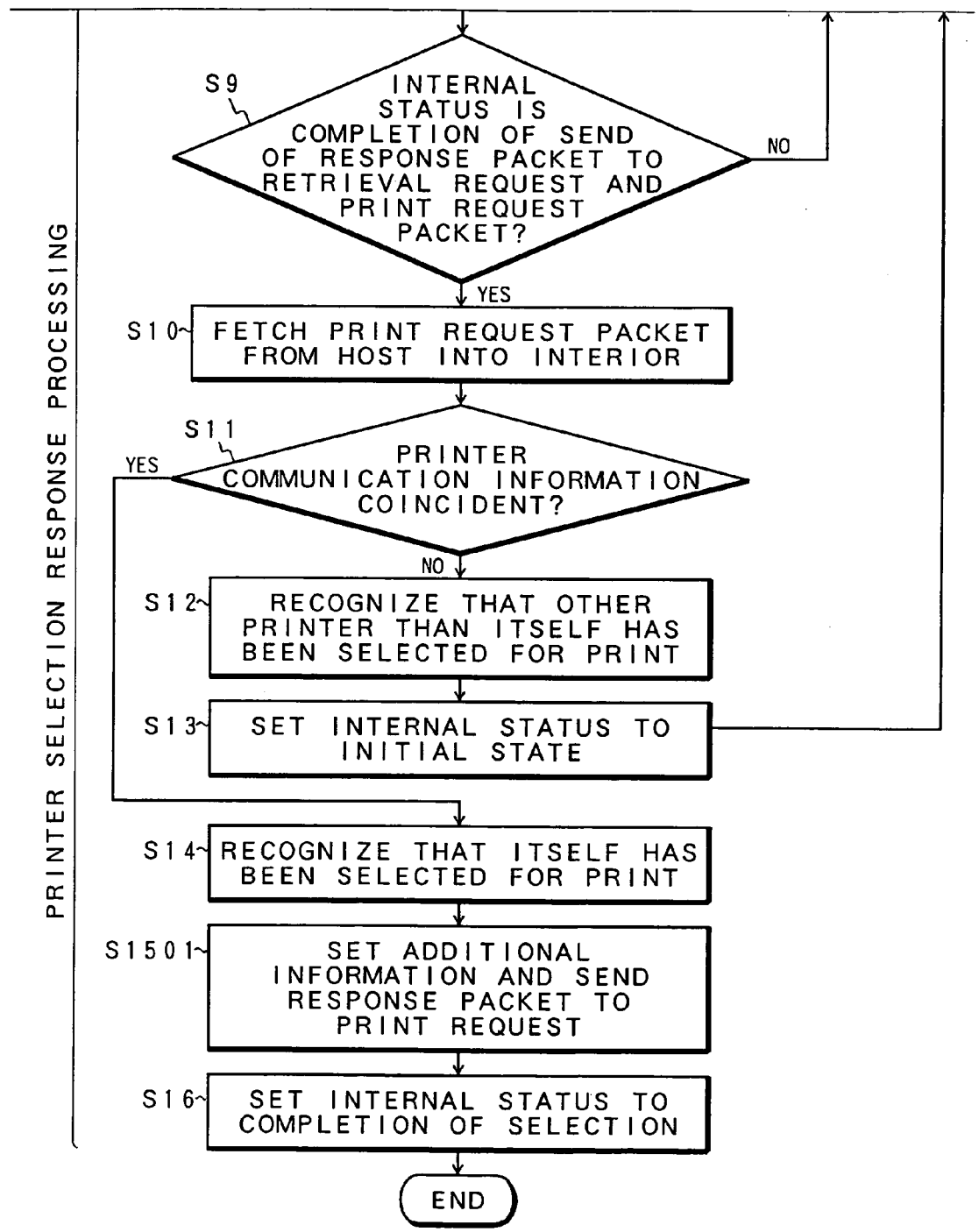

On the printer side of FIGS. 19A and 19B on the other hand, the printer waits for the receipt of the print request packet from the host in step S6, and accepts the print request packet from the host in step S8. When the print request packet is received, the printer verifies in step S9 whether the status of itself is the completion of send of the response packet to the retrieval request or the other status. Since it is the completion of send of the response packet to the retrieval request in this case, the printer fetches in step S10 as the effective packet only the print request packet from the host provided with the identifier indicative of the print request. If the other packet is accepted, then that packet is ignored to allow a return to step S6 for waiting for the receipt of the print request packet. After fetching of the print request packet into the interior in step S10, the printer communication information is verified in step S11. If it is coincident with the communication information of itself, then the procedure goes to step S14 in which the printer recognizes that the host has selected that printer for the printing operation. If the printer information is not coincident with the communication information of the printer itself, then the procedure goes to step S12 in which the printer recognizes that the host has selected the printer other than itself without making any response to the host in particular. Then in step S13 the internal status is restored to the initial state, allowing a return to step S1 for waiting for the receipt of the retrieval request packet from the host. If the printer recognizes in step S14 that itself has been selected, then in step S15, for the response packet to the print request of FIG. 12, there are set the identifier indicative of the response information to the print request of the response information 82, the printer communication information 84 such as the printer ID address or the port number, and the additional information 88, in this case "5$^{th}$ floor office" indicative of the printer placement site, for sending the response packet to the host. After the completion of send of the response packet to the print request, the internal status is changed to the completion of send in step S16, thereafter preparing for the actual printing processing. Finally the host side accepts the response packet from the printer in step S14 of FIG. 19B, and verifies in step S15 whether the status of itself is in print request or in the other status. Since it is in print request in this case, the printer judges as the effective packet only the response packet from the printer provided with the identifier indicative of the response to the print request and fetches it into the interior in step S16. If the other packet is accepted, then that packet is ignored allowing a return to step S13 for waiting for the receipt of the response packet. After internal fetching of the response packet from the printer in step S16, the print data transfer unit 52 within the host 10 of FIG. 8 is posted in step S17 on the printer communication information set in the response packet so that the print data transfer unit can start the actual printing processing in step S18. At the same time, in step S19, the user interface 50 within the host is posted on the information indicative of the printer placement site which is "5$^{th}$ floor office" of the additional information set in the response packet to the print request received from the printer so that the user interface 50 can display the "5$^{th}$ floor office" set in the additional information on the GUI in step S20 and can post the operator on the actual output target printer. In such processing, even in case of automatic detection of the printer for printing operation, the operator may designate any specific printer.

According to the present invention, as set forth hereinabove, upon the definition of a printer on the host, the port of the printer is abstractly set and both the host and the printer have print protocol control for performing e.g., the retrieval of the printer whereby in case of newly adding a printer to the network or in case of varying the address of the existing printers, or in case of excluding the printer from the network, a single printer has only to be defined on the host without any need to redefine the printer for the addition, change and deletion of the printer, thus ensuring effective and easy management and operation of the network and the printer. The present invention is also advantageous in that the host side operator can cause a print by effective use of the idle printer without being conscious of the status of the printer on the network. It is also possible to set printer information resulting in unique printer IDs on the host side and the printer side so that the operator can designate the printer information upon the print request to thereby automatically detect a specific printer for printing operation.

The present invention is not limited to the above embodiments but covers any appropriate variants without impairing its objects and advantages. Furthermore, the present invention is not restricted by the numerical values shown in the above embodiments.

What is claimed is:

1. A printing system comprising:
   a print requester host; and
   a single or a plurality of print requestee printers connected via a network to said host; wherein
   said host defining a port of a printer driver serving as an output path to said single or plurality of printers without setting information regarding actual destination of a print request; and when there occurs a print request to said port of the printer driver, said host selects a printer from said single or plurality of printers through sequential execution, between said host and said printer on said network, of a retrieval request from said host, a retrieval response from said printer, a print request from said host, and a response to said print request from said printer; and the requested printing is done by the selected printer.

2. A printing system according to claim 1, wherein upon occurrence of a print request on said host, said host sends a retrieval request packet to a plurality of printers on said network, wherein said printer that has received said retrieval request packet from said host, if enabled for print, sends a retrieval response packet to said host, wherein upon receipt of said retrieval response packet from said printer, said host selects as a requestee candidate a printer from which said host has first received a retrieval response, to send a print request packet to said requestee candidate printer, wherein said requestee candidate printer that has received said print request packet sends a validation response packet to a print request to said host, and wherein upon receipt of said validation response packet from said requestee candidate printer, said host determines said requestee candidate printer as a print requestee to execute print processing.

3. A printing system according to claim 1, wherein said printer that has received a retrieval request packet from said host sends a retrieval response packet to said host, said retrieval response packet containing communication information on said printer itself, wherein upon receipt of said retrieval response packet from said printer, said host sends a print request packet to a plurality of printers on said network, said print request packet containing communication information on a printer selected, and wherein upon receipt of said print request packet, said printer compares printer communication information contained in said print request packet with its own printer communication information, said printer if coincident recognizing that said printer itself has been selected, to send a validation response packet to said host.

4. A printing system according to claim 1, wherein said host displays information indicative of a printer selected on the basis of a printer response packet, on a user interface.

5. A printing system according to claim 1, wherein said host makes a retrieval request to said printers on said network, said retrieval request containing unique printer specific information for specifying a printer, said host automatically selecting a printer selected from said single or plurality of printers, that conforms with previously entered printer specific information, for printing.

6. A printing system according to claim 5, wherein said host sends a retrieval request packet to all printers on said network with unique printer specific information designated, wherein upon receipt of said retrieval request packet from said host, said printer sends a retrieval response packet to said host providing that said printer is enabled for print and that said designated unique printer specific information is coincident with its own printer specific information, wherein upon receipt of said retrieval response packet from said printer, said host when said received printer specific information coincides with said designated printer specific information sends a print request packet to said printer having coincident printer specific information, wherein a printer selected from said single or plurality of printers that has received said print request packet sends a validation response packet to a print request to said host, and wherein upon receipt of said validation response packet from said printer, said host determines said printer as a print requestee for print processing.

7. A printing method for performing a printing operation by selective use of a single or a plurality of printers connected via a network from a print requester host, said method comprising the step of:

defining a port of a printer driver serving as an output path to said single or plurality of printers without setting information regarding actual destination of a print request;

when there occurs a print request to said port of the printer driver, selecting a printer from said single or plurality of printers through sequential execution, between said host and said single or a plurality of printers on said network, of a retrieval request from said port, a retrieval response from said printer, a print request from said port, and a response to said print request from said printer; and executing the requested printing.

8. A printing method according to claim 7, wherein upon occurrence of a print request on said host, a retrieval request packet is sent to a plurality of printers on said network, wherein said printer that has received said retrieval request packet from said host, if enabled for print, sends a retrieval response packet to said host, wherein upon receipt of said retrieval response packet from said printer, said host selects as a requestee candidate a printer from which said host has first received a retrieval response, to send a print request packet to said requestee candidate printer, wherein said requestee candidate printer that has received said print request packet sends a validation response packet to a print request to said host, and wherein upon receipt of said validation response packet from said requestee candidate printer, said host determines said requestee candidate printer as a print requestee to execute print processing.

9. A printing method according to claim 7, wherein said printer that has received a retrieval request packet from said host sends a retrieval response packet to said host, said retrieval response packet containing communication information on said printer itself, wherein upon receipt of said retrieval response packet from said printer, said host sends a print request packet to a plurality of printers on said network, said print request packet containing communication information on a printer selected, and wherein upon receipt of said print request packet, said printer compares printer communication information contained in said print request packet with said its own printer communication information, said printer if coincident recognizing that said printer itself has been selected, to send a validation response packet to said host.

10. A printing method according to claim 7, wherein
said host displays information indicative of a printer selected on the basis of a printer response packet, on a user interface.

11. A printing method according to claim 7, further comprising the steps of:
making a retrieval request from said host to said printers on said network, said retrieval request containing unique printer specific information for specifying a printer; and
automatically selecting a printer selected from said single or plurality of printers, that conforms with previously entered printer specific information, to perform said printing operation.

12. A printing method according to claim 11, wherein
said host sends a retrieval request packet to a plurality of printers on said network with unique printer specific information designated, wherein
upon receipt of said retrieval request packet from said host, said printer sends a retrieval response packet to said host providing that said printer is enabled for print and that said designated unique printer specific information is coincident with its own printer specific information, wherein
upon receipt of said retrieval response packet from said printer, said host when said received printer specific information coincides with said designated printer specific information sends a print request packet to said printer having coincident printer specific information, wherein
a printer selected from a single or a plurality of printers, that has received said print request packet sends a validation response packet to a print request to said host, wherein
upon receipt of said validation response packet from said printer, said host determines said printer as a print requestee to execute print processing.

13. A print requester apparatus for performing a printing operation by selective use of any one of a plurality of printers connected via a network, said apparatus comprising:
an output port of a printer driver that is defined as an output path to said plurality of printers without setting information regarding destination of a print request; and
a printer retrieval unit which, when there occurs a print request to said port of the printer driver, selects a printer from said plurality of printers through sequential execution, between said printer retrieval unit and said plurality of printers, of a retrieval request from said host, a retrieval response from said printer, a print request from said host, and a response to said print request from said printer.

14. A print requester apparatus according to claim 13, wherein
upon occurrence of a print request, said printer retrieval unit sends a retrieval request packet to a plurality of printers on said network, wherein
upon receipt of a retrieval response packet from a print enabled printer, said printer retrieval unit selects as a requestee candidate a printer from which said printer retrieval unit has first received a retrieval response, to send a print request packet to said requestee candidate printer;
upon receipt from said requestee candidate printer of a validation response packet to said print request packet, said printer retrieval unit determines said requestee candidate printer as a print requestee to execute print processing.

15. A print requester apparatus according to claim 14, wherein
said printer retrieval unit displays information indicative of a printer selected on the basis of a printer response packet, on a user interface.

16. A print requester apparatus according to claim 13, wherein
said printer retrieval unit makes a retrieval request to said printers on said network, said retrieval request containing unique printer specific information for specifying a printer, said printer retrieval unit automatically selecting a printer selected from said single or plurality of printers, that conforms with previously entered printer specific information, to perform a printing operation.

* * * * *